US010903902B2

(12) United States Patent
Nabavi et al.

(10) Patent No.: US 10,903,902 B2
(45) Date of Patent: Jan. 26, 2021

(54) CONFORMAL VISIBLE LIGHT COMMUNICATION (VLC) RECEIVER AND METHOD OF USE

(71) Applicant: University of Central Florida Research Foundation, Inc., Orlando, FL (US)

(72) Inventors: Pooya Nabavi, Orlando, FL (US); Murat Yuksel, Ocoee, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 16/662,250

(22) Filed: Oct. 24, 2019

(65) Prior Publication Data

US 2020/0136724 A1 Apr. 30, 2020

Related U.S. Application Data

(60) Provisional application No. 62/753,646, filed on Oct. 31, 2018.

(51) Int. Cl.
| | |
|---|---|
| *H04B 10/116* | (2013.01) |
| *H04B 15/00* | (2006.01) |
| *H04B 10/69* | (2013.01) |
| *H04B 10/114* | (2013.01) |

(52) U.S. Cl.
CPC ....... *H04B 10/116* (2013.01); *H04B 10/1143* (2013.01); *H04B 10/6911* (2013.01); *H04B 15/00* (2013.01)

(58) Field of Classification Search
CPC .................................................. H04B 10/116
See application file for complete search history.

(56) References Cited

U.S. PATENT DOCUMENTS

| | | | | |
|---|---|---|---|---|
| 2002/0027689 A1* | 3/2002 | Bartur | ................... | H04B 10/40 398/139 |
| 2018/0138976 A1* | 5/2018 | Knapp | ................. | H04B 10/116 |

OTHER PUBLICATIONS

P. Mark, Ethernet Over Light, University of British Columbia, Jan. 6, 2015 [online], [retrieved on Jun. 12, 2020]. Retrieved from the Internet <URL: https://open.library.ubc.ca/cIRcle/collections/ubctheses/24/items/1.0167659> (Year: 2015).*
Li et al., An integrated PIN-array receiver for visible light communication, Journal of Optics, 17, 105805(2015).
Huang et al., Indoor multi-robot intelligent coordination based on omni-directional visible light communication, Chinese Optics Letters, col. 14(10), 102301(2016).
Chen et al., Long-range visible light communication system based on LED collimating lens, Optics Communications, 377 (2016) 83-88.

(Continued)

*Primary Examiner* — Nathan M Cors
(74) *Attorney, Agent, or Firm* — Molly L. Sauter; Smith & Hopen, P.A.

(57) ABSTRACT

A mobile visible light communication (VLC) receiver and associated method of use which overcomes the detrimental effects of the time-varying inter-symbol interference (ISI) due to the VLC receiver's high acceptance angle and vibration in the structure utilizing an optimal multiple-symbol detection (MSD) module and a decision feedback affine projection algorithm (DF-APA) module.

18 Claims, 12 Drawing Sheets

(56) References Cited

OTHER PUBLICATIONS

Binh et al., Demonstration of 300 Mbit/s Free Space Optical Link with Commercial Visible LED, https://doi.org/10.1109/NEWCAS.2013.573602 (2013).
Vucic et al., 803 Mbit/s Visible Light WDM Link based on DMT Modulation of a Single RGB LED Luminary, https://ieeexplore.ieee.org/document/5875646/ (2011).
Guo et al., A high-speed phosphorescent LED-based visible light communication system utilizing SQGNRC precoding technique, Photon Netw Commun (2017) 34:461-467.

* cited by examiner

CONFORMAL VISIBLE LIGHT COMMUNICATION (VLC) RECEIVER AND METHOD OF USE

CROSS-REFERENCE TO RELATED APPLICATIONS

This application claims priority to U.S. Provisional Patent Application No. 62/753,646 filed on Oct. 31, 2018 and entitled "Conformal Visible Light Communication (VLC) Receiver with Photodetector Arrays", the entirety of which is incorporated herein by reference.

GOVERNMENT SUPPORT STATEMENT

This invention was made with government support 1663764 awarded by the National Science Foundation. The Government has certain rights in the invention.

BACKGROUND OF THE INVENTION

Optical wireless communications have brought forward a potential framework for reaching secure, high-throughput, and cost-effective wireless communications in multi-user environments, free space and underwater. As the density of Internet-of-Things (IoT) devices is increasing in our living spaces, legacy radio frequency (RF) bands are getting more scarce and expensive to license. Further, due to the interference caused by the omni-directional RF signals, the aggregate wireless network throughput increases sub-linearly, and there is an urgent need for more spatial reuse to increase the aggregate wireless network capacity.

Optical bands ($\approx$100 nm-1 mm) are directional (i.e., amenable to high spatial reuse) and offer promising complementary wireless channels to help solve the spectrum crunch we are facing. Visible Light Communication (VLC), operating in the visible optical bands (($\approx$400-700 nm), offers a great potential as it can simultaneously utilize the emerging solid-state lighting technologies and attain wireless communication as a complement to the legacy cellular RF bands. VLC can play an important role in the emerging 5G wireless systems by coexisting with WiFi and providing high-speed indoor access. Further, VLC can enable localization and access applications in GPS- or RF-challenged environments such as asset tracking in a hospital or inventory monitoring in a supermarket. It can also contribute to smart city applications such as road safety systems and autonomous vehicles.

Compared to the legacy RF-based wireless communications, VLC has many advantages including higher bandwidth, higher potential for spatial reuse and lower probability-of-intercept. Although these features make VLC a perfect solution for high-throughput indoor wireless networking, a casual office setting involves many dynamics that may hinder the benefits of VLC. The frequent existence of mobility and undesired vibrations caused by regularities of an office setting (e.g., a simple shake from typing on a laptop or movements of smart phone while talking or watching video) may adversely affect the efficient signal reception at a VLC receiver. Such casual operation can cause attenuation and impose a time varying inter-symbol interference (ISI) on the received optical signal, and hence limit the viable communication bit rate and effective range of indoor VLC systems. This impediment hampers the widespread usage of VLC systems and necessitates intelligent receiver design and efficient transmission and reception methods.

Accordingly, what is needed in the art is an improved VLC receiver that is effective in overcoming the known dynamics that currently hinder the benefits of VLC.

SUMMARY OF INVENTION

To enable visible light communication (VLC) for mobile receivers, the present invention provides a wide field-of-view (FOV) optical receiver with off-the-shelf components and in forms that are conformal to the receivers' surface.

In various embodiments, the present invention provides a visible light communication (VLC) receiver which includes, a photodetector (PD) array comprising a plurality of photodetectors to generate data-carrying photo-current in response to receiving a visible light communication, a transimpedance amplifier coupled to the PD array, the transimpedance amplifier to convert the data-carrying photo-current from the PD array to data-carrying voltage signals, a high pass filter coupled to the transimpedance amplifier to filter the data-carrying voltage signals from the transimpedance amplifier to output filtered data-carrying voltage signals and a wideband voltage amplifier coupled to the high pass filter, the wideband voltage amplifier to amplify the filtered data-carrying voltage signals to output amplified filtered data-carrying voltage signals. The VLC receiver further includes a voltage detector coupled to the wideband voltage amplifier, the voltage detector to convert the amplified filtered data-carrying voltage signals to a transistor-transistor logic (TTL)-compliant bitstream.

The voltage detector of the VLC receiver may be a symbol-by-symbol detector (SBSD) an optimal multiple-symbol detector (MSD) or a decision feedback affine projection detector (DF-APA).

In a specific embodiment, the VLC receiver may include high-efficiency optical transmitters with high brightness (7645 Lux in 1 m) low power (36 W) white LED panels, which also provide proper lighting. To overcome the detrimental effects of the time-varying inter-symbol interference (ISI) due to the VLC receiver's high acceptance angle and vibration in its structure, an optimal multiple-symbol detection (MSD) algorithm may be used. The MSD attains remarkable improvements compared to the symbol-by-symbol detection but with an exponentially increasing computing time cost. To decrease the MSD's computing demands, an adaptive Decision Feedback Affine Projection Algorithm (DF-APA) may alternatively be used. DF-APA attains a notable further improvement with polynomial computation complexity which allows faster response to VLC channel dynamics.

In an additional embodiment, the present invention provides a method for visible light communication (VLC) reception. The method includes, receiving a visible light communication at a photodetector (PD) array, the PD array comprising a plurality of photodetectors, generating, at the PD array, data-carrying photo-current in response to receiving the visible light communication, converting the data-carrying photo-current from the PD array to data-carrying voltage signals at a transimpedance amplifier coupled to the PD array, filtering the data-carrying voltage signals from the transimpedance amplifier to output filtered data-carrying voltage signals at a high pass filter coupled to the transimpedance amplifier to filter and amplifying the filtered data-carrying voltage signals to output amplified filtered data-carrying voltage signals at a wideband voltage amplifier coupled to the high pass filter. The method further includes, converting the amplified filtered data-carrying voltage signals to a transistor-transistor logic (TTL)-compliant bitstream at a voltage detector coupled to the wideband voltage amplifier.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
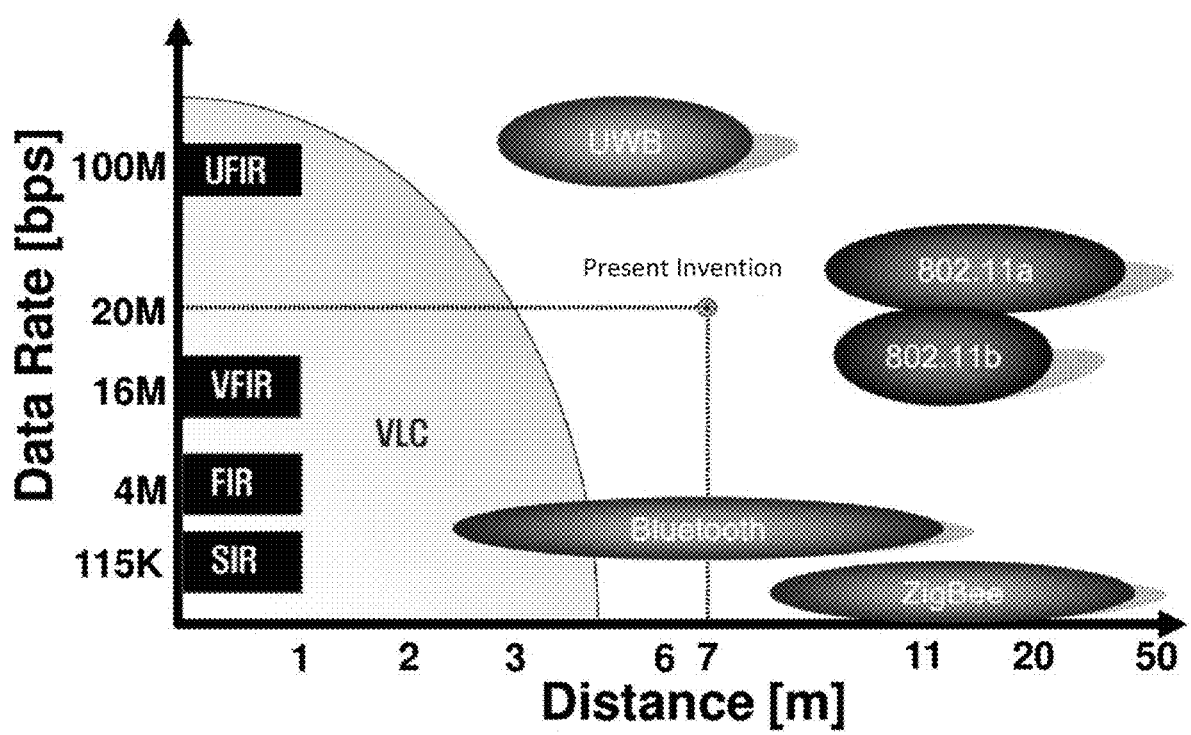
FIG. 1 illustrates the efficiency of visible light communication (VLC) systems known in the art vs. other wireless standard, and in comparison to, the VLC receiver of the present invention.

While there have been major efforts in VLC receiver design, VLC receivers are still not widely and commercially adopted. As shown in FIG. 1, insufficient efficiency to offer both high speeds (tens of Mbps) and long ranges (at least 5 m) is among the major reasons dissuading users to extensively employ these receivers. Moreover, the limited field of view (FOV))(≈75°) and detection area (≈1 mm$^2$) in the existing VLC receivers cause the generated data-carrying photo-current signal to be small and the quality of the data reception to be dependent on the spatial positions of the receiver and transmitter. These limitations make it impossible to broadly implement wide-range VLC systems in environments where the receiving person is constantly on the move.

In the present invention, by making the VLC receivers conformal, the focus can be on the design and implementation of wide FOV receivers that show a maximum transmission rate of 20 Mbps at a range of 7 m. Moreover, as discussed below, the quality of the received signal in the designed system of the present invention is, to a great extent, independent of the spatial positions of the receiver and transmitter due to its large aggregate active detection surface area and omni-directional reception.

Photodetectors (PDs) play a critical role in the design of VLC receivers. Hence, selecting appropriate PDs is one of the most important decisions in the design of such receivers. The active area of a photodetector (PD) is a critical factor. Large aggregate surface areas increase the FOV of the receiver but also reduce the effective bandwidth and increase the DC noise caused by background light. For mobile VLC, large FOV allows the receiver's performance to be more independent of the location of the transmitter. This, in turn, enhances the detection robustness of the receiver under mobility. Moreover, impingement of photons on the PD detection window generates a greater output current in PDs with larger active detection areas compared to those with smaller ones. PDs with large active areas reduce the need to employ high feedback resistance in transimpedance amplifier (TIA) circuits to convert data-carrying currents to voltage. Note that this reduction in resistance attenuates the thermal noise caused by the TIA circuit, further increasing the signal-to-noise ratio (SNR) at the amplifier input. On the other hand, increasing the active area of a PD increases its junction capacitor, consequently increasing its rise and fall times. This effect decreases the achievable bit rate and bandwidth of the PD, which in turn decreases the overall bandwidth of the receiver. Also, increasing the active detection area of the PD increases the low frequency (DC) dark current caused by background light at the PD output.

In a particular embodiment of the invention, the VLC receiver design utilizes the PD FDS1010 by Thorlab with a 1 cm² area. The large surface area of this PD is the first reason it was selected over other PDs available on the market which usually have 1 mm² active detection area. As another advantage, the selected PD also demonstrated the smallest rise time (highest bandwidth, (≈20 MHz) among all other PDs with the same active detection area of 1 cm² available in the market. Table I summarizes other relevant specifications of this PD.

TABLE I

IMPORTANT CHARACTERISTICS OF FDS1010
Specifications

| | |
|---|---|
| Wavelength Range, λ | 350-1100 nm |
| Peak Responsivity, max $\mathcal{R}(\lambda)$] | 0.725 A/W |
| Active Area per PD, A | 100 mm² |
| Rise/Fall Time, $t_r/t_f$ ($V_B$ = 18 V) | 18 ns |
| Dark Current ($V_B$ = 18 V) | 80 μA |
| Capacitance, $C_J$ ($V_B$ = 18 V) | 169.2 pF |
| Maximum Tolerable Reversed Biased, $V_{B, max}$ | 25 V |
| Maximum Output Photocurrent, $I_o$ | 10 mA |
| Maximum Optical Input Power, $P_{i, max}$ | 10 mW |

Figure 2A:
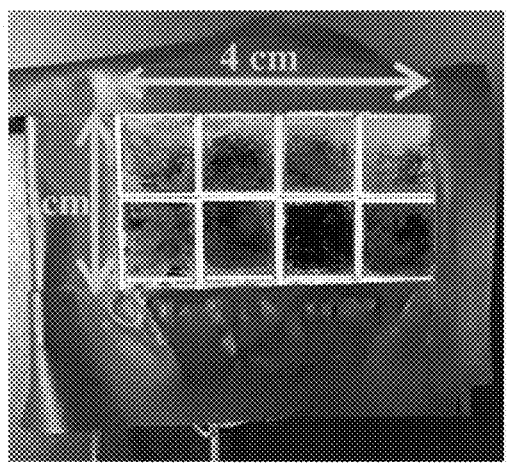
FIG. 2(a) illustrates a flat conformal photodetector (PD) array structure, in accordance with an embodiment of the present invention.
Figure 2B:
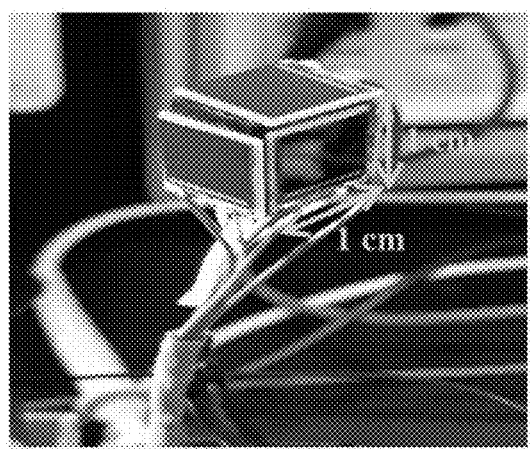
FIG. 2(b) illustrates a cubical conformal PD array structure, in accordance with an embodiment of the present invention.

In order to attain a 360° FOV, an array of five FDS1010 PDs was organized into a structure conformal to a cube as shown in FIG. 2(b) wired in parallel. The cubical structure of PD arrays allows omni-directional signal reception. Such PD arrays can be arranged in a way conformal to the surface of the mobile receiver unit, e.g., a laptop or smartphone. This cubic structure offers two main advantages: it considerably reduces the dependency of the signal quality on the corresponding spatial positions of the receiver and transmitter and, moreover, eliminates the need for employing optical components such as plato convex lenses, which are usually used for focusing the incident light on the small detection window of the PD in order to increase the output current generated by the incident light. In an alternative embodiment, FIG. 2(a) illustrates a flat conformal PD shape.

Although PD arrays could potentially increase the FOV to 360°, they also increase the delay spread of the channel impulse response, which in turn increases the ISI. Consequently, the average BER, particularly at high bit rates, also increases when deployed in a vibrant mobile VLC link.

Amplification of the received signal with a high gain while maintaining stability is very important in order to provide a long VLC range. Existing amplification of PD signals involves only one TIA designed for low-speed operation and uses high feedback resistor $R_F$ to attain high gain. But, high $R_F$ limits the bandwidth (as in Eq. 2), and such designs are not appropriate for the VLC goals with large surface area PDs operating at high speeds.

Figure 3:
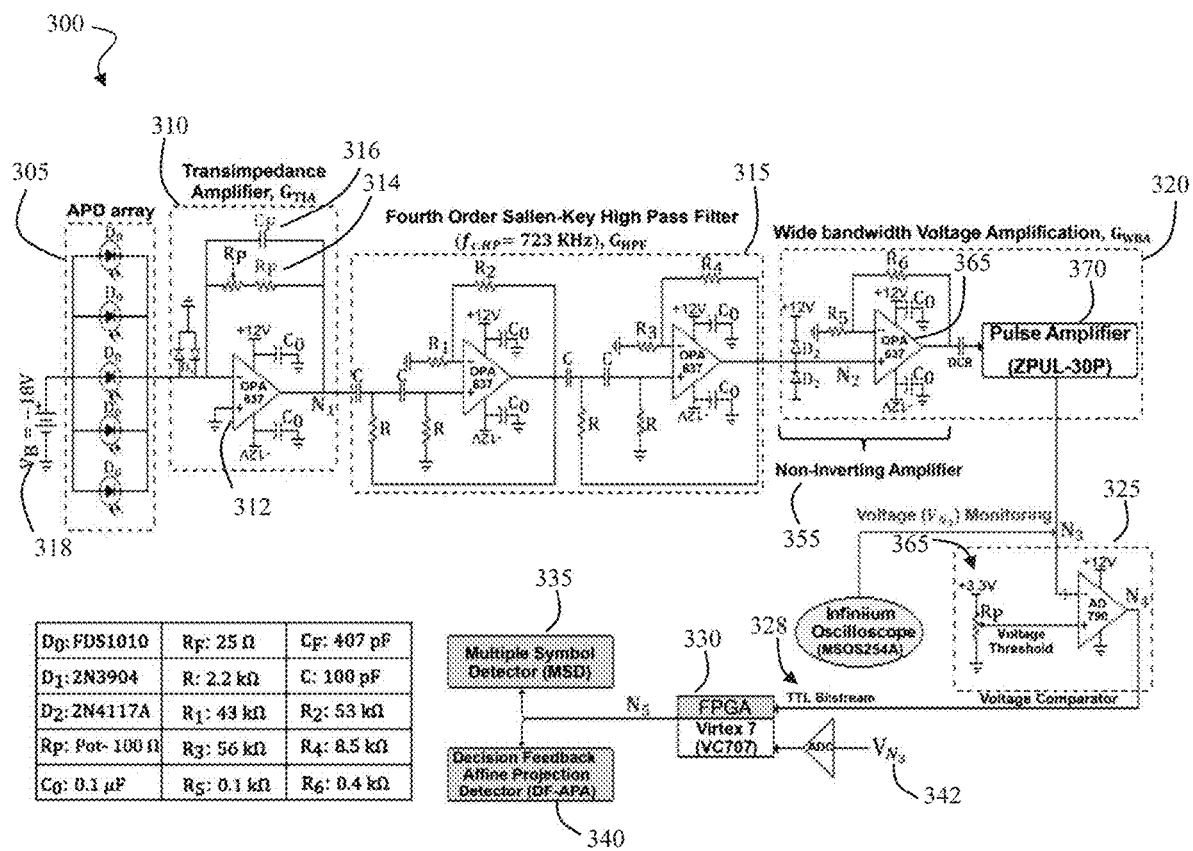
FIG. 3 is a schematic illustration of a VLC receiver, in accordance with an embodiment of the present invention.
Figure 4A:
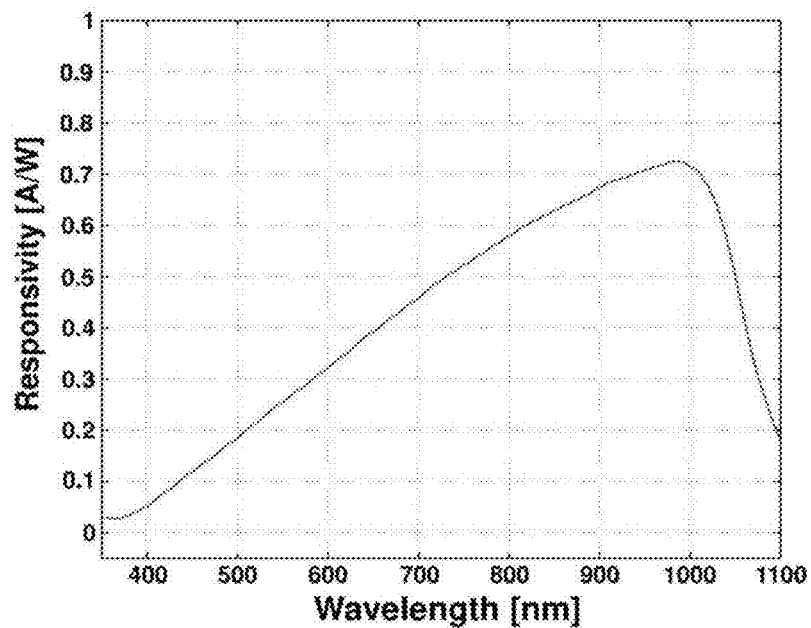
FIG. 4(a) is a graphical illustration of the responsivity of the PD, in accordance with an embodiment of the present invention.

With reference to FIG. 3, in accordance with the present invention, in order to maintain wide bandwidth, high gain and long communication range, the VLC receiver 300 amplifies and detects the data-carrying signal from the PD array 305 through three stages. The three stages include a transimpedance pre-amplification 305 for current-to-voltage conversion (Stage 1) and a non-inverting amplifier 355 for voltage amplification (Stage 2). Between these two stages, a high pass filter 315 is used. As shown in FIG. 3, the wide bandwidth amplification 320 of Stage 2 is further followed by a wideband pulse amplifier 370 (Stage 3) which provides a 30 dB gain at a 500 MHz bandwidth. The overall gain of the receiver 300 is:

$$G = \frac{V_{out}}{I_o} = G_{TIA} G_{HPF} G_{WBA} \quad (1)$$

where $V_{out}$ is the output data-carrying analog voltage of the amplification, $V_{N_3}$ 342 in FIG. 3, and $I_o$ denotes the output current generated by the PD arrays 305 and is equal to $\int_{350\ nm}^{1100\ nm} N_{PD} P_i \mathcal{R}(\lambda) d\lambda$ where $N_{PD}$=5 is the total number of PDs used in the cubic arrays 305. $P_i$ is the power spectrum of the incident light, and $\mathcal{R}$ is the responsivity of the single PD within a wavelength range of 350 to 1100 nm, as shown in FIG. 4(a). Further, $G_{TIA}$, $G_{HPF}$, and $G_{WBA}$ are the TIA 310 gain (Stage 1), the gain of the high pass filter 315, and the gain of wideband amplification 320 (Stages 2 and 3). It is additionally necessary to find the appropriate configurations of the high-pass filter 315, as well as Stages 1 310 and 2 320 of the voltage amplification.

A PD signal can be measured as voltage or current. The PD current measurement demonstrates far better linearity, offset, and bandwidth performance. The generated photocurrent is proportional to the incident light power and it must be converted to a voltage using a transimpedance configuration. The PD can be operated with or without an applied reverse bias depending on the application-specific requirements. Application of a reverse bias (i.e., cathode positive, anode negative) can greatly improve the speed of response and linearity of the devices. In the present configuration, the detector is reverse biased to reduce PD's total junction capacitance, thus reducing its rise time, $t_r$. Moreover, the reverse biasing technique was employed through active TIA in order to eliminate the dependency between the voltage of the PD's cathode pin and the feedback resistor, $R_F$ 314, responsible for converting voltage to current. As shown in FIG. 3, the cathode pin is connected to the inverting pin of the operational amplifier which has the same zero voltage as its non-inverting pin. As one of the advantages of this structure, the voltage difference between the two PD pins is independent of the undesirable variations of $R_F$ 314 caused by the changes in the ambient temperature. This, in turn, leads to further independence of the receiver bandwidth from the temperature conditions in indoor office environments.

Figure 4B:
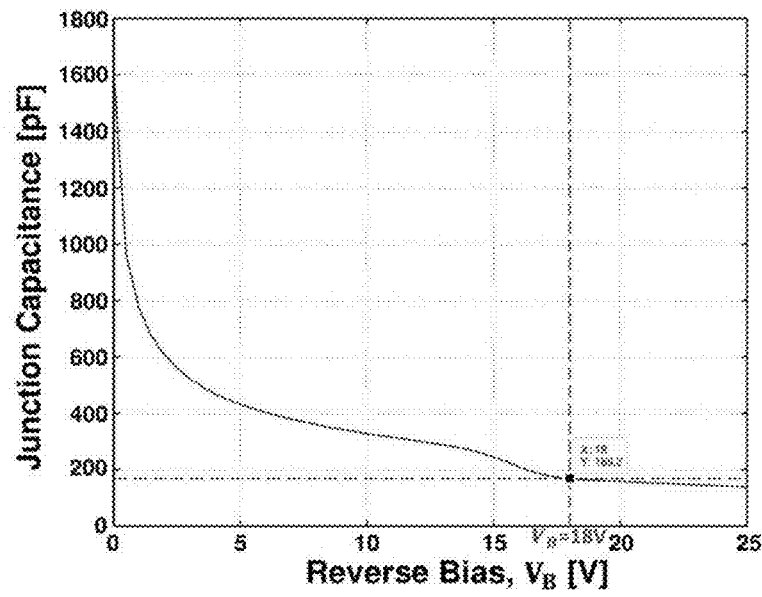
FIG. 4(b) is a graphical illustration of the junction capacitance of the PD, in accordance with an embodiment of the present invention.

The overall bandwidth (BW) of the receiver is directly determined by $R_F$ as follows:

$$BW[\text{Hz}] = \sqrt{\frac{GBP}{2\pi \times R_F \times (C_j + C_F)}} \qquad (2)$$

where GBP is the gain bandwidth product of the operation amplifier (OPA637BP) 312 and is equal to 80 MHz, $C_F$ 316 is the feedback phase-compensation capacitor, and $C_J$ is the equivalent junction capacitance of the cubical structure which can be obtained by:

$$C_j = A \times \sqrt{\frac{\epsilon_0 \epsilon_r}{2\mu\rho(V_B + V_{bi})}} \qquad (3)$$

where $\epsilon_0 = 8.854 \times 10^{-14}$ F/cm is the permittivity of the free space, $\epsilon_r = 11.9$ is the silicon dielectric constant, $\mu = 1,400$ cm²/(Volt*second) is the mobility of the electrons at 300 K (average room temperature), $\rho$ is the resistivity of the silicon, $V_{bi}$ is the built-in voltage of silicon, A=5 cm² is the overall active detection area of the cubical structure and $V_B$ 318 is the applied bias. The junction capacitance is directly used to determine the speed of the PD response, as in Eq. (2). Moreover, the PD's junction capacitance can be reduced by applying a higher reverse voltage, as shown in FIG. 4(b), up to the 25 V, which is the maximum tolerable reverse bias for the PDs used in the cubic structure. The bias voltage reduces the junction capacitance, causing the PD to have a faster response (smaller rise and fall time). Applying a reverse bias, however, will increase the dark and noise currents.

Incorrect calculation of $R_F$ 314 and $C_F$ 316 leads to quick instability of the receiver and quick saturation of the operational amplifiers employed in the receiver. From the Barkhausen stability criterion, oscillation can occur if the phase margin is insufficient in the unit closed-loop gain of the TIA circuit 310. At lower frequencies, the phase shift in the feedback signal is 180° due to the inverting nature of the negative feedback. As the frequency (bit rate) increases, the dominant pole of the operational amplifier can add up to 90° of phase shift. Similarly, the pole introduced by the feedback network can add another 90° of phase shift, thus producing a phase shift of about 360° at closed loop gain equal to one. A phase shift of 360° results in self-sustaining oscillations. If the phase shift is close to 360°, heavy ringing is observed. In either case, phase compensation will be required to stabilize the TIA circuit 310.

Adding a bypass capacitor 316 in parallel with the feedback resistance 314 provides the necessary compensation to guarantee sufficient phase margin and it also avoids gain peaking at high frequencies (near 10-20 MHz) and protect the operational amplifier from saturation. It is critical to calculate the value of the feedback capacitor required to provide optimal compensation. However, as observed in Eq. (2), unfortunately the feedback capacitor $C_F$ 316 will limit the frequency response, eventually forcing a trade off to be made. As a result, the goal is to find the minimum value for the compensation capacitor, $C_F$ 316, needed to eliminate oscillation and minimize ringing. For this purpose, the TIA's 310 open loop gain and its feedback factor are obtained, respectively, as follows:

$$A_v(f) = \frac{a_0}{1 + j\frac{f}{f_c}} \qquad (4)$$

$$\beta(f) = \frac{X_{C_J}}{R_F \parallel X_{C_F} + X_{C_J}} = \frac{1 + j(2\pi f)R_F C_F}{1 + j(2\pi f)R_F(C_F + v_j)} \qquad (5)$$

where $f_c$ denotes the cut-off frequency of the OPA637 amplifier 312 in the open-loop mode which is 90 Hz, $a_0 = 120$ dB represents the DC open loop gain of the amplifier.

In addition, $$X_{C_J} = \frac{1}{jC_J(2\pi f)} \text{ and } X_{C_F} = \frac{1}{jC_F(2\pi f)}$$

are the impedance of the cubic PD 305 and feedback capacitor 316 corresponding to frequency, f respectively. $C_J$ represents the equivalent capacitance for the 5 parallel PDs (Eq. (3)), assuming a value of 846 pF at a bias voltage of $V_B = 18$ V 318.

Finding the right value for the feedback capacitance $C_F$ 316 involves tuning its trade off with phase margin and bandwidth. Higher $C_F$ 316 means more stability (i.e., large phase margin) but less bandwidth. In this design, a target of 45° of phase margin (i.e., $180° + \angle A_{84}(f_i)\beta(f_i) = 45°$ where $f_i$ is the intercept frequency which is obtained by solving $|A_v(f)\beta(f)| = 1$). The 45° phase margin provides a good compromise between stability and bandwidth, and enables one to obtain a closed-form $C_F$:

$$C_F = \frac{1 + \sqrt{1 + 4.8\pi \times R_F \times C_j \times GBP}}{2.4\pi \times R_F \times GBP} \qquad (6)$$

In order to make sure the biasing circuit does not become a bottleneck to the VLC receiver's BW, it is necessary to select the feedback resistor $R_F$ as large as possible (for high gain) while not limiting the maximum achievable BW of the PD FDS1010.

To respect the BW of the PD, it is necessary to satisfy BW $[\text{Hz}] \geq f_{P,D,3\ dB}$, where $$f_{PD,2dB} \approx \frac{0.35}{t_r}$$

is the frequency at which the PD output decreases by 3 dB and is equal to 19.85 MHz when $t_r$ is 18 ns measured at $V_B = 18$ V according to Table 1. By substituting Eq. (6) in Eq. (2), and solving BW $[\text{Hz}] \geq 19.85$ [MH$_z$], the maximum value of $R_F$ is found to be 25Ω. Finally, by substituting $R_F = 25\Omega$ in Eq. (6), $C_F$ calculates to 407 pF.

Using a PD array 305 having 5 parallel PDs at the input of the TIA circuit 310, the background light in office environments (which was measured in the lab to be around 400 Lux at a 2 m distance from the transmitter) along with dark current generates a DC voltage equal to $R_F \times (I_{dc} + I_{BG})$ (roughly 3 V measured in the lab) at the output of the TIA circuit 310. If this DC voltage is not effectively eliminated, saturation quickly occurs when amplifying the data carrying voltage, $V_{N_1}$. Moreover, this undesired DC voltage at the input of the non-inverting amplifier ($N_2$) 355 limits the voltage swing at the output, $V_{N_3}$, which prevents the circuit from high gain amplification of the data-carrying signal, consequently limiting the communication range accessible by the receiver. In order to eliminate the DC voltage from the output of the TIA stage 310 and deduct the noise, a fourth-order Butterworth Sallen-Key high pass filter 315 was implemented with a cut-off frequency of 723 kHz ($\approx 0.7 \times R_{b,min}$). In order to obtain the appropriate values for the capacitors and resistors used in the filter, the transfer function of the filter is written as:

$$H_1(s) = \frac{V_{N_2}(s)}{V_{N_1}(s)} = \frac{(3-k_1)(3-k_2)}{\left(\frac{s^2}{\omega_c^2}+\frac{k_1 s}{\omega_c}+1\right)\left(\frac{s^2}{\omega_c^2}+\frac{k_2 s}{\omega_c}+1\right)} \quad (7)$$

where $$\omega_c = 2\pi f_{c,HP} = \frac{1}{RC}$$

and $f_{c,HP}$=723 kHz is the cut-off frequency considered for the high-pass filter and is obtained by setting R=2.2 kΩ and C=100 pF. More over, $$k_1 = 2 - \frac{R_2}{R_1} \text{ and } k_2 = 2 - \frac{R_4}{R_3}.$$

Finally, by assuming R2=53 kΩ, R1=43 kΩ, R3=56 kΩ and R4=8.5 kΩ, yields the desired values for $k_1$=0.7654 and $k_2$=1.8478 and as a result, the denominator in Eq. (7) becomes equivalent to $$B_4\left(\frac{s}{\omega_c}\right)$$

where $B_4(s)=(s^2+0.7654 s+1)(s^2+1.8478 s+1)$ is a fourth-order Butterworth polynomial. As a result, a −80 dB decay (i.e. fourth-order decay) is experienced at the cut-off frequency of 723 kHz.

Generation of a transistor-transistor logic (TTL)-compliant bitstream is among the very first and important steps in transmission and processing of the received signals using the FPGA digital processor 330. The amplified data-carrying voltage signal undergoes a two-level digitization for conversion to a TTL-compliant bitstream. The propagation delay of the comparator chip 325 is a very important factor in maintaining the high bandwidth of the receiver system during the digitization of the data-carrier analog signals.

Offering a propagation delay of 45 ns, the AD790 voltage comparator 325 is a great choice for transmission of information at bit rates in the order of 20 Mbps. Moreover, as another feature, the AD790 comparator chip 325 offers the capability of adjusting the high-level voltage at the output bitstream. In order to maintain the output compatibility of the comparator and the general purpose input output (GPIO) of the FPGA processor 350, the high-level voltage is set to 3.3 V. The structure of the digitizer is shown in FIG. 3. In this structure, a 100Ω potentiometer 360 and a voltage source of 3.3 V 365 are used to produce the threshold voltage. In an exemplary embodiment, the threshold voltage is determined to be 0.8 V by averaging the sample data-carrier voltage signals at the output of the wideband amplifier 320 during a 0.1 second period. After obtaining the TTL-compliant data-carrier bitstream at the output of the comparator 325, the bitstream is stored and received in a FPGA (Virtex 7) 330 at its dual port RAM using the GPIO interface and displayed on a monitor.

Figure 5A:
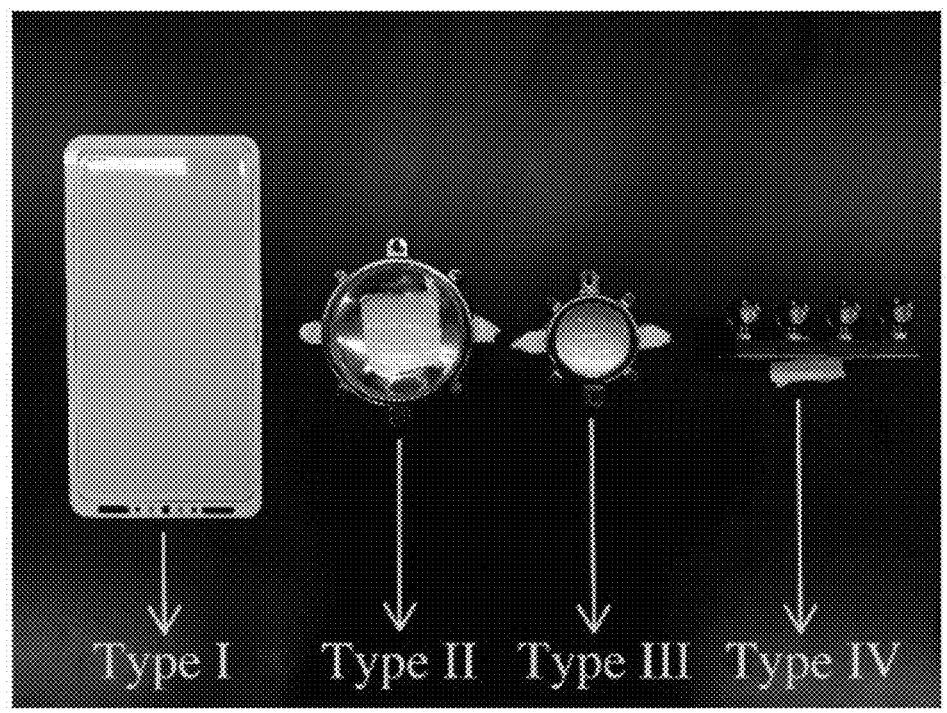
FIG. 5(a) is an illustration of four different light sources that could be employed to transmit the visible light communication to be received at the VLC receiver in accordance with an embodiment of the present invention.

The most important parameters when selecting the appropriate light source for VLC include maximum tolerable oscillation frequency [Hz], power usage level [W], brightness [Lux] and coverage area of the considered source. Phosphorus LEDs are the predominant choice for transmitters mostly because they can be switched on and off and oscillate in very short intervals (≈35-40 MHz) while providing a relatively high illuminance with a low power consumption. As shown in FIG. 5(a), four different structures (Types I-IV) composed of phosphorus LEDs are considered for the transmitter. In the first structure, the focus is on the effect of increasing the number of distributed LEDs on the brightness with a relatively high cross-sectional area in the absence of collimator lenses and, consequently, the maximum communication range. In the second and third structures, the collimation of the ray emitted from the light source is studied along with its effects on the quality and communication range. In the fourth structure, the phosphorus LEDs with a low divergence angle is examined. The results of comparing these structures are in Table II.

TABLE II

CHARACTERISTIC AND EFFICIENCY MEASUREMENTS FOR DIFFERENT OPTICAL TRANSMITTERS.

| Parameter | LED Model | | | |
| --- | --- | --- | --- | --- |
| | Type (I) | Type (II) | Type (III) | Type (IV) |
| Number of LEDs Included in the structure | 336 | 100 | 100 | 4 |
| Diameter of the Collimator Lens [mm] | — | 78 | 50 | — |
| Focal Length of the Collimator Lens [mm] | — | 50 | 44 | — |
| Lambertian emission [Degree] | 120 | 70 | 60 | 35 |
| Illuminance at 1 meter distance [Lux] | 7645 | 6246 | 5445 | 2100 |
| Power Usage [W] | 36.3 | 29.9 | 23.3 | 14.2 |
| Luminous Efficacy $\left[\frac{Lux}{W}\right]$ | 210 | 208 | 233 | 147 |
| Junction Capacitance [nF] | 1.3 | 0.4 | 0.8 | 5.4 |
| Max Communication Range (For Having BER ≤ $10^{-5}$ @ 1 Mbps) [m] | 7.1 | 6 | 4.8 | 1.8 |
| Heat Management Needed? | No | Yes | Yes | No |
| Lamp Base Shadow [Degree] | 120 | 105 | 105 | 120 |

Figure 5B:
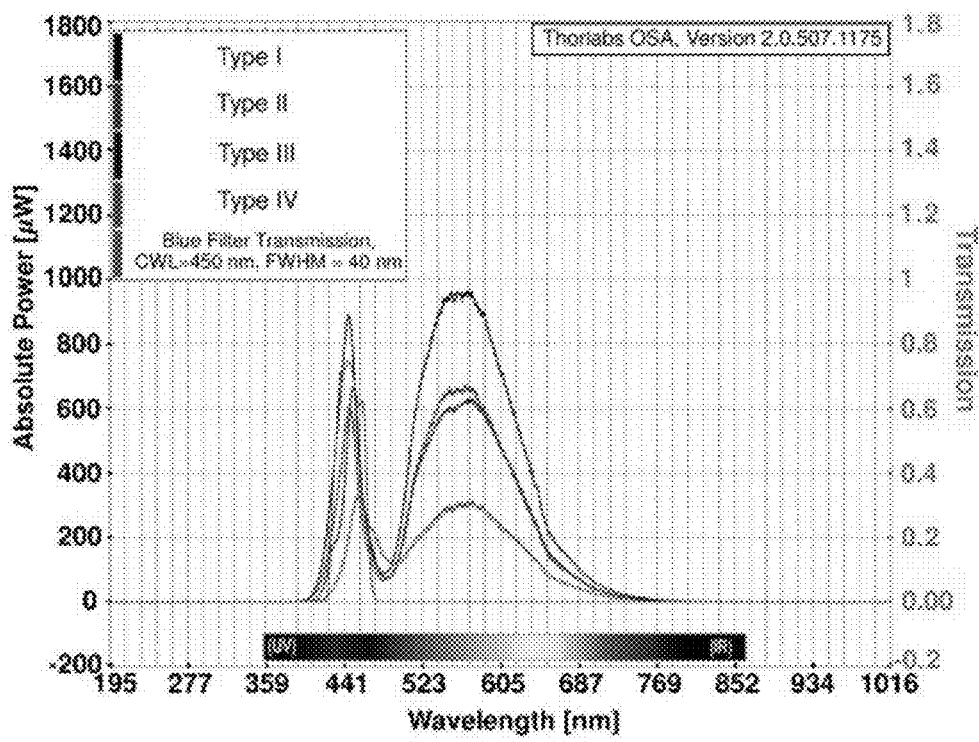
FIG. 5(b) is a graphical illustration of an emission spectrum of the various lights courses of FIG. 5(a), in accordance with an embodiment of the present invention.
Figure 5C:
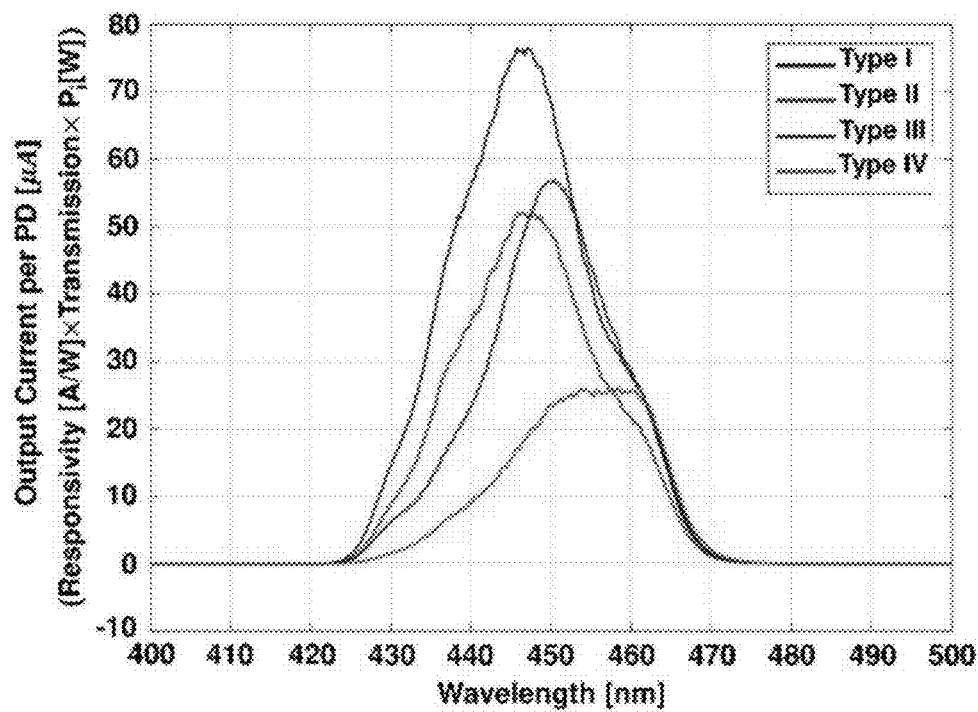
FIG. 5(c) is a graphical illustration of a current spectrum of the various lights courses of FIG. 5(a), in accordance with an embodiment of the present invention.

Efficacy of light intensity generated by a light source is also a key parameter. To choose the appropriate light source, the emission spectrums corresponding to the incident power of the four structures by using Thorlab's optical spectrum analyzer (OSA) were measured. FIG. 5(b) shows both absolute power [pW] and wavelength [nm] from the measurements at 1 m distance on the line-of-sight of the structures. As observed, there are two major peaks, one around wavelength 445 nm and the broad phosphorus spectrum centered near to 545 nm causing limitation in the overall achievable modulation bandwidth. To reject the slow phosphorescent components, a dichroic optical bandpass filter was placed in front of the PD arrays. This blue filter, by retaining only the blue light signals of the LED, improves the modulation bandwidth and BER of the VLC system by attaining high SNR. FIG. 5(c) shows the output photocurrent spectrum of the structures after their signals pass through the blue filter.

After comparing and examining the respective emission spectrums and luminous efficacy [Lux/W] for these four lighting candidates, the first structure was selected for the VLC system prototype. Due to its relatively low electrical power consumption (36 W), this structure enables the receiver to generate the highest output current at the 1 m distance without the need for collimator lenses and heat management.

Figure 5D:
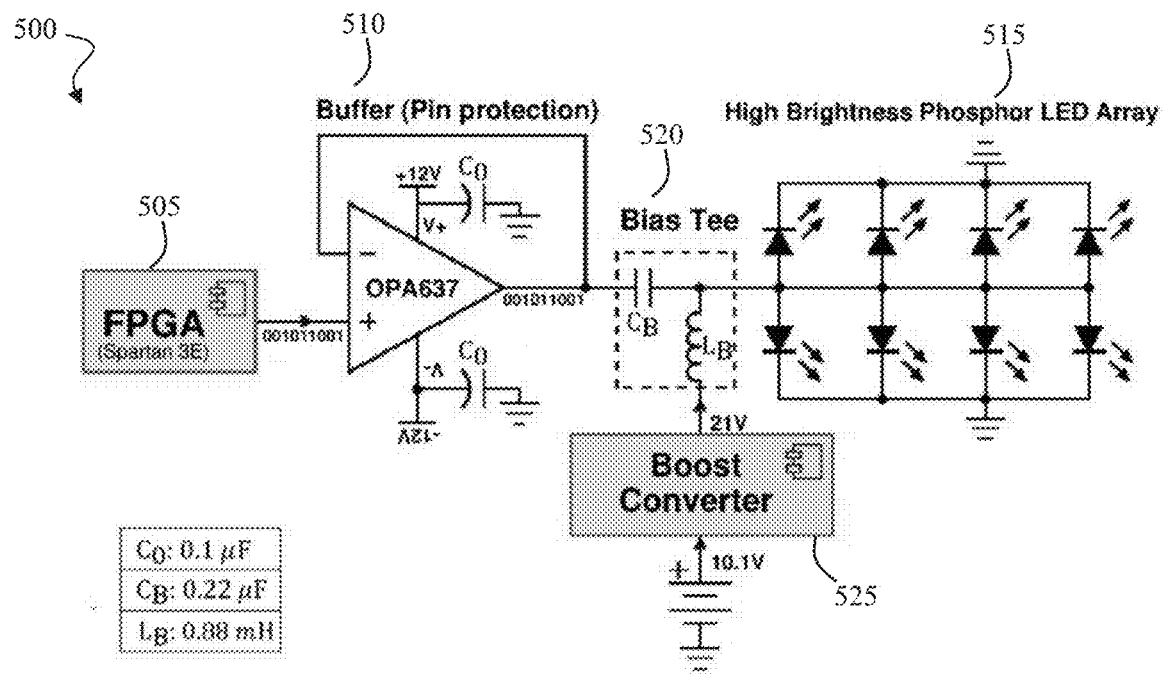
FIG. 5(d) is an illustration of a visible light communication transmitter schematic, in accordance with an embodiment of the present invention.

With reference to FIG. 5(d), after selecting the appropriate light source, the transmitter system 500 was designed to send the data using the FPGA 505. To transmit the data-carrying bitstream through FPGA (Spartan 3E) 505, the bitstream was stored at an internal single port ROM 510. The desired transmission bit rate can be adjusted up to 50 MHz by adjusting the pulse frequency of the clock.

The bits of the transmitted message enter the buffer circuit 510 from the FPGA 505 through the GPIO interface in an orderly manner and one the positive edge of the clock pulse, after which they appear at the buffer output. The reason to employ the buffer 510 was to protect the FPGA 330 processor pins against possible leakage of the DC current from the DC branch to the signal-carrier branch. The operational amplifier OPA637 was used in the implementation of the considered buffer due to its high gain bandwidth product (≈80 MHz).

A wide-band bias tee 520 was used to prevent the leakage of the data-carrier signal to the DC branch as well as to prevent the leakage of the DC current to the branch containing data signals. FIG. 5(d) demonstrates the circuit of the transmitter 500. The DC branch in the transmitter circuit is responsible for supplying the appropriate DC voltage necessary for biasing the corresponding lighting structure 515 employed in the transmitter. Furthermore, a boost converter 525 was utilized in the DC branch in order to step up the biasing voltage (while stepping down the current) from its power supply to the output (which is connected to the LED panel 515). Battery power systems often stack cells in series to achieve higher voltages. However, sufficient stacking of cells is not a proper solution (or sometimes possible) in many high voltage applications due to lack of space. Boost converters can increase the voltage and reduce the number of cells. As a result, by suing a single 9-volt battery, the 18.1 V potential can be provided that is needed to drive and bias the LED panel 515.

In order to evaluate the receiver in the presence of vibration, the entire body of the receiver's structure was assembled on a servo motor. In this exemplary prototype embodiment, Arduino was used to control the speed and direction of the servo, which enables the production of an intense vibration pattern with the desired characteristics (i.e. frequency, acceleration, velocity, and displacement) in the body of the receiver.

Experiments were performed under various scenarios. First, in order to study the effects of vibration on the quality, the eye diagram of the received signal at transmission rates ranging from 1 to 20 Mbps was plotted, in both absence and presence of vibration. The data eye diagram is constructed from a digital waveform present in the output of the comparator ($N_4$) in the receiver side by folding the parts of the waveform corresponding to each individual bit into a single graph with amplitude versus time graph. By repeating this construction over many samples of the waveform, the resultant graph will represent the average statistics of the signal, resembling an eye. In a second scenario, real-time transmission and reception were established. To assess the average BER at bit rates from 1 to 20 Mbps in presence of vibration, a 512×512 black and white image was transmitted and the error probability was calculated by comparing the received and transmitted images. This procedure was repeated 1,500 times to obtain the average BER.

Real-time eye diagrams in FIG. 6(a)-FIG. 6(h) provide instant visual data that can be used to check the prototype's signal integrity in both absence (FIG. 9(c), FIG. 9(e), FIG. 9(g)) and presence of (FIG. 9(d), FIG. 9(f), FIG. 9(h)) vibration. The vibration intensity of the considered indoor office setting was also characterized and measured, for both vibrant (FIG. 9(b)) and non-vibrant (FIG. 9(a)) VLC links.

Figure 6A:
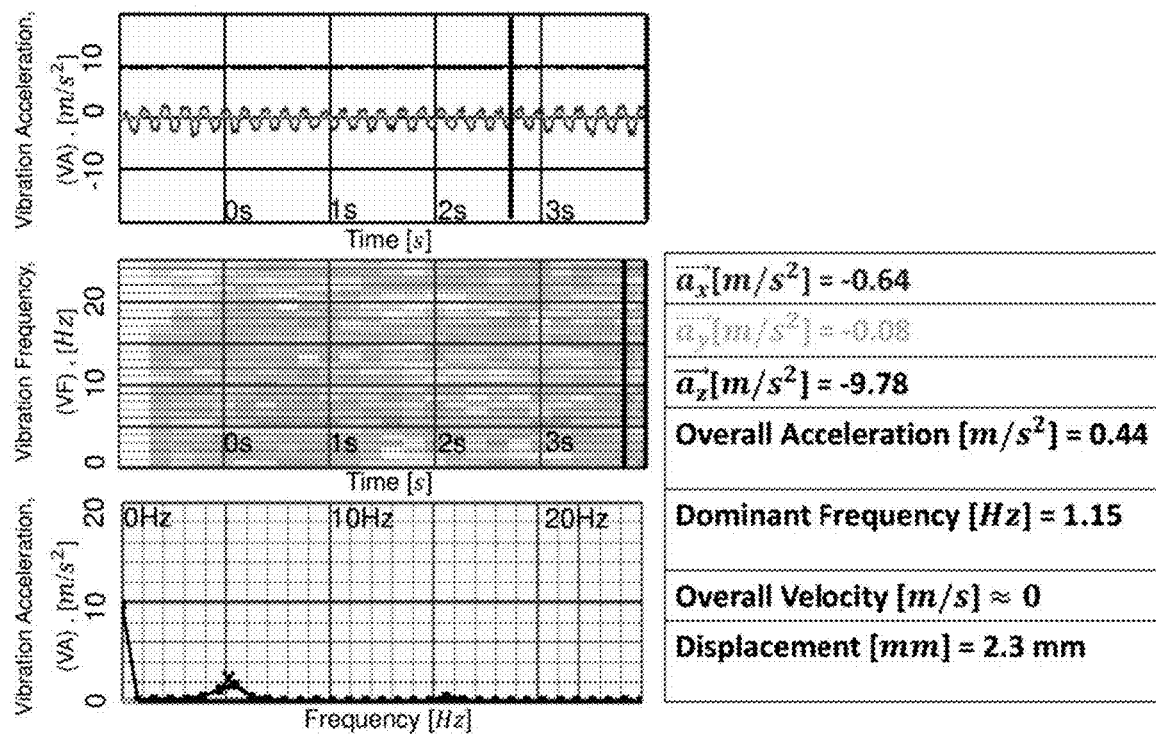
FIG. 6(a) illustrates experimental results for both vibrant and non-vibrant 7.1 m long
VLC links and for vibrations conditions when communicating in a non-vibrant VLC link, in accordance with an embodiment of the present invention.
Figure 6B:
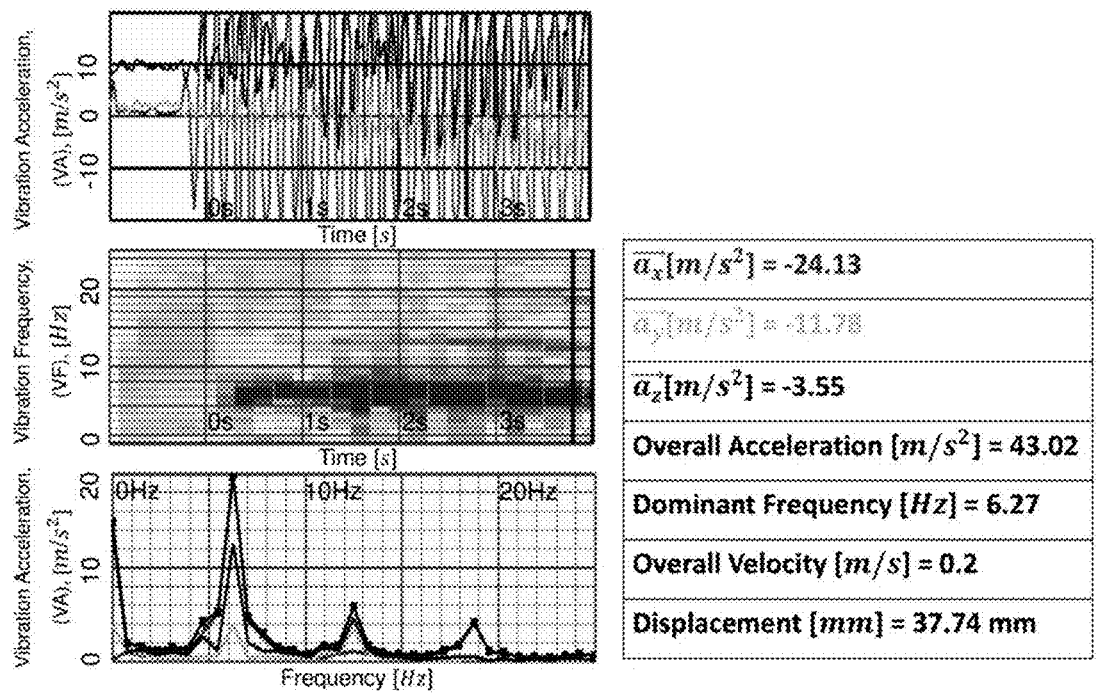
FIG. 6(b) illustrates experimental results for both vibrant and non-vibrant 7.1 m long VLC links and for vibrant VLC link when step-motor (400 R.P.M.) operates, in accordance with an embodiment of the present invention.
Figure 6C:
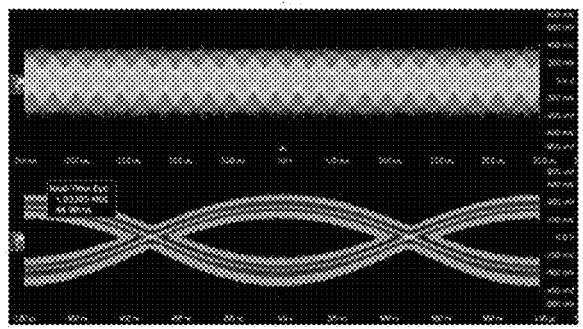
FIG. 6(c) illustrates an eye diagram for the 1 MBps data rates in a non-vibrant 7.1 m long VLC, in accordance with an embodiment of the present invention.
Figure 6D:
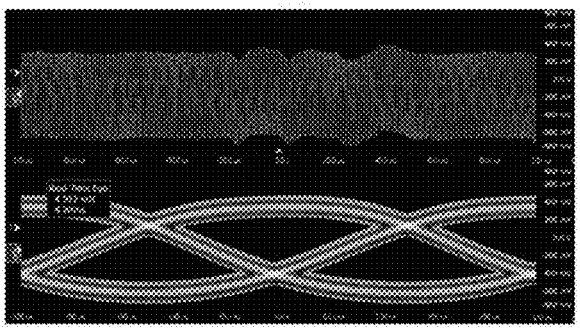
FIG. 6(d) illustrates an eye diagram for the 1 MBps data rates in a vibrant (speed 0.2 m/s, acceleration of 43.02 m/s$^2$, displacement of 37.74 mm and frequency of 6.27 Hz) 7.1 m long VLC, in accordance with an embodiment of the present invention.
Figure 6E:
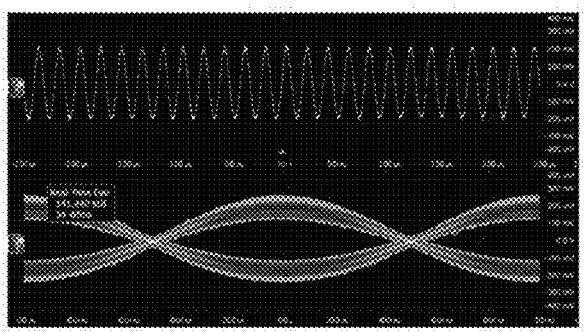
FIG. 6(e) illustrates an eye diagram for the 10 MBps data rates in a non-vibrant 7.1 m long VLC, in accordance with an embodiment of the present invention.
Figure 6F:
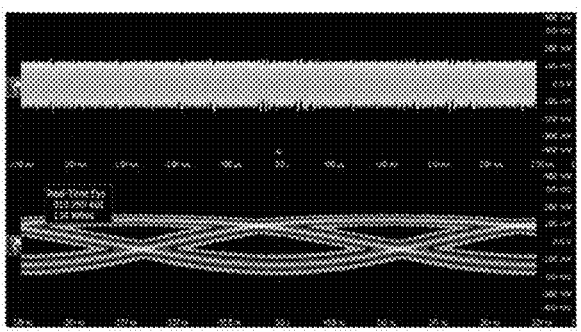
FIG. 6(f) illustrates an eye diagram for the 10 MBps data rates in a vibrant (speed 0.2 m/s, acceleration of 43.02 m/s$^2$, displacement of 37.74 mm and frequency of 6.27 Hz) 7.1 m long VLC, in accordance with an embodiment of the present invention.

As shown in FIGS. 6(d)(f)(h) (from top to bottom), the increased ISI (which is due to the time varying receiver FOV caused by vibration in the receiver's body) creates distortion and eye-closure. The reception quality in the absence of vibration at different transmission bit rates was also assessed by measuring the eye amplitude in FIGS. 6(c)(e)(g). As shown, by increasing the transmission bit rate from 1 Mbps in FIG. 6(c) to a maximum 20 Mbps in FIG. 6(g), the respective eye amplitude is decreased, which is an indication of the decrease in the received SNR at the receiver output.

Figure 6G:
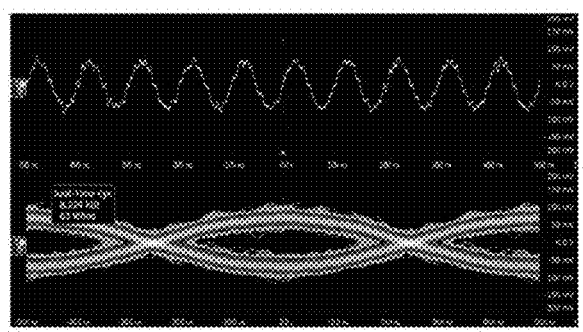
FIG. 6(g) illustrates an eye diagram for the 20 MBps data rates in a non-vibrant 7.1 m long VLC, in accordance with an embodiment of the present invention.
Figure 6H:
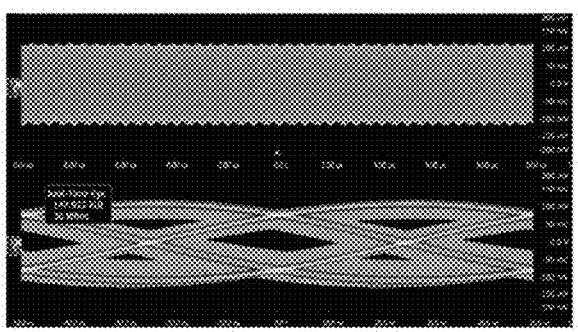
FIG. 6(h) illustrates an eye diagram for the 20 MBps data rates in a vibrant (speed 0.2 m/s, acceleration of 43.02 m/s$^2$, displacement of 37.74 mm and frequency of 6.27 Hz) 7.1 m long VLC, in accordance with an embodiment of the present invention.

To understand the VLC link's speed and range limits, the performance of the VLC receiver at a bit rate of 20 Mbps in FIG. 6(g) and FIG. 6(h) was evaluated. The eye amplitude, in these cases, is approximately 100 mV (≥40 mV that is root mean square (RMS) noise voltage typical in room temperature), suggesting the capability of the VLC system in reception at a maximum transmission bit rate of 20 Mbps and communication range of 7 m when operating in both vibrant and non-vibrant VLC links. Any further increase in the bit rate leads to SNRs smaller than 1 at the receiver output, depriving the system of an effective reception and an acceptable BER.

Figure 7:
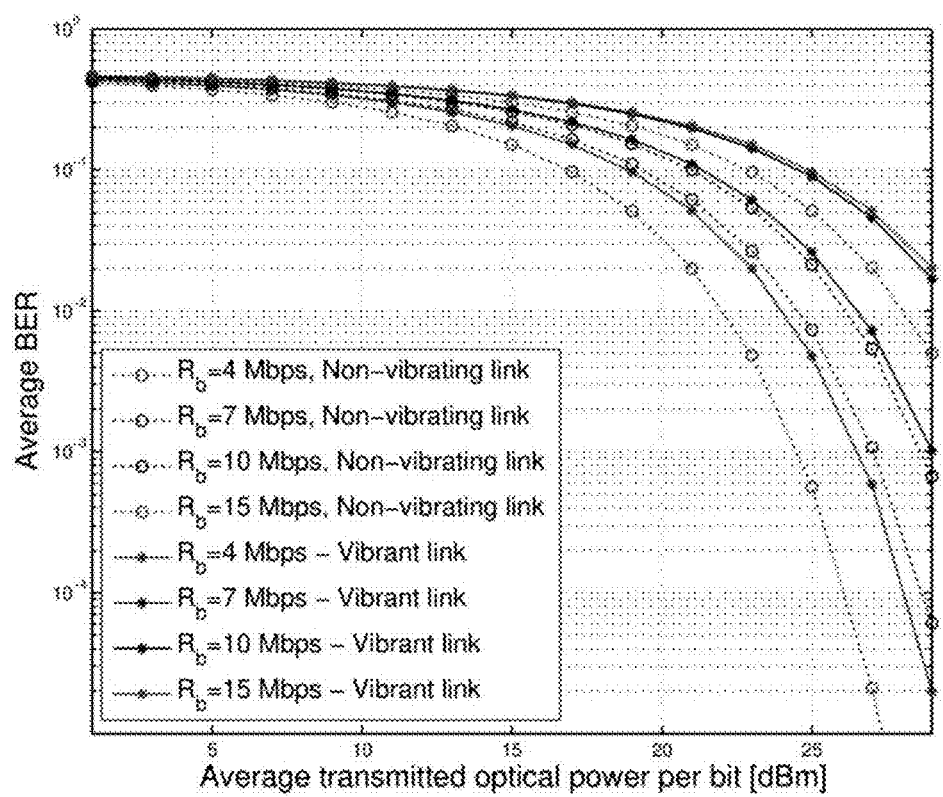
FIG. 7 is a graphical illustration of the BER performance results for 7.1 m vibrant and non-vibrant VLC links, in accordance with an embodiment of the present invention.
Figure 8:
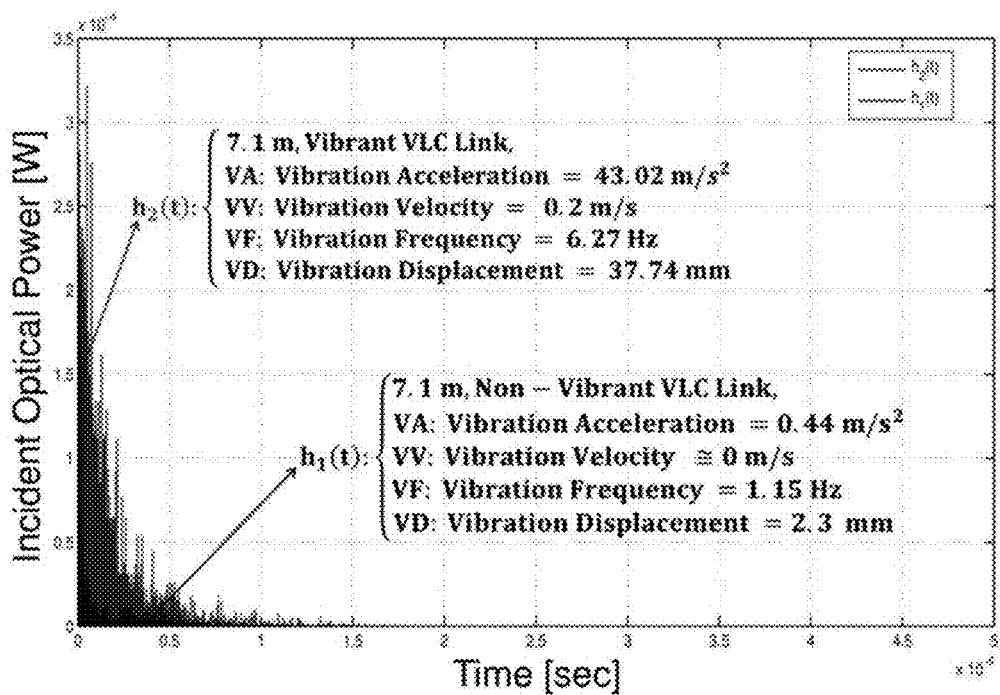
FIG. 8 is a graphical illustration of the channel impulse response for 7.1 m vibrant and non-vibrant VLC links, in accordance with an embodiment of the present invention.

The suboptimal symbol-by-symbol detection of the bitstream and plot of the BER for different transmission bit rates from 1 to 20 Mbps at 7.1 m distance was employed and FIG. 7 shows that the average BER increases in the presence of vibration. This behavior could also be predicted from the eye diagrams. Existence of vibration in the receiver body causes time variations in the FOV of the receiver, which in turn increases the delay spread in the impulse response of the channel, as shown in FIG. 8, ultimately generating and increasing the time-varying ISI. This consequently increases and quickly saturates the average BER at bit rates close to 20 Mbps.

Understanding the effect of vibration on the VLC channel is crucial and, to the best of the applicant's knowledge, has not been empirically done before. From the exemplary prototype, the channel impulse response was measured to calculate the approximate delay spread of the VLC channel in both presence and absence of vibration. High delay spread indicates the amount of ISI in the channel, and thus, tells a lot about the channel quality. To empirically measure the impulse response, a 5 µs high signal was sent from the transmitter and stored $V_{N_2}$ in a buffer. The stored $V_{N_2}$ is proportional to the intensity of the incident light radiated on the PD. Finally, assuming linearity in the channel behavior, the channel impulse response was estimated by calculating the inverse FFT of the ratio of the FFT of $V_{N_2}$ to the FFT of transmitted high signal of width 5 µs. The channel's RMS delay spread in both presence and absence of vibration was also calculated using:

$$\tau_{RMS,i} = \sqrt{\frac{\int_{-\infty}^{\infty}(t-\tau_i)^2 h_i^2(t)dt}{\int_{-\infty}^{\infty} h_i^2(t)dt}}, i = 1, 2 \quad (8)$$

where $\tau_i$ is the mean delay due to non-LOS paths and is give by $\tau_i = \int_{-\infty}^{\infty} h_i^2(t)tdt/\int_{-\infty}^{\infty} h_i^2(t)dt$ i=1, 2. Here, $h_2(t)$ and $h_1(t)$ are the estimated impulse responses for the VLC channel with or without vibration, respectively. By Eq. (8), the effective delay spread $\tau_{RMS,1}$=312.23 ns and $\tau_{RMS,2}$=7.04 ns over 7 m.

Drawing on the experimental results, the impulse response of the VLC channel in the previous section was obtained, revealing that the delay spread of the channel drastically increases in the presence of the intense vibration in the receiver. The delay spread interrupts the symbols transmitted on the channel and deteriorates the overall performance of the optical system, which in turn limits the communication range.

In an additional exemplary embodiment, an optimal detector is designed, aiming to restore the performance lost in symbol-by-symbol detection due to the ISI in which detection decisions are made using a multi-bit observation window. In this embodiment, on the transmitter side, intensity modulation direct-detection with On-Off Keying (OOK) modulation has been assumed, wherein 1s represented with high light intensity and 0s with low light intensity. As a result, the transmitted data sequence of the transmitter can be expressed as:

$$x(t) = \Sigma_{m=0}^{\infty} b_m P(t-kT_b) \quad (9)$$

where $$T_b = \frac{1}{R_b}$$

is the bit duration time and $R_b$ is the data transmission rate. Moreover, in this scheme, bits "0" and "1" of each time slot will be transmitted with pulse shapes 0 and P(t), respectively, and $b_m \in [0,1]$ is the OOK modulated signal corresponding to the $m^{th}$ transmitted bit (or symbol).

On the receiver side of the VLC system, the output data-carrying analog signal (i.e. $V_{N_3}$ in FIG. 3) is integrated over consecutive bit times (i.e., $\int_{kT_b}^{(k+1)T_b} V_{N_3}(t)dt$) and as a result a discrete signal is built in each time slot, i.e., r(k) where k indicates the index of the time interval at which $k^{th}$ transmitted bit is integrated. When a photon hits a PD, the generated output photo-current of the PD (i.e., the total number of generated photo-electrons) obeys a Poisson distribution. The output of the integrator can be modeled as a Poison Point Process whose average is in proportion with the total optical incident power. The integrated output of the optical detector can be modeled as:

$$r(k) = y(k) + v_{b,d}(k) \quad (10)$$

where $v_{b,d}(k)$ is the Poisson noise (including background and dark current noises) during the detection of the kth symbol in the receiver. $v_{b,d}(k)$ is a Poisson variable $$n_b = \frac{2\eta_Q n_E P_{BG} T_b}{hf} \text{ and } n_d = \frac{2I_{dc} B T_b}{q}$$

with an average value of $(n_b+n_d)T_b$, where are the number of photo-electrons generated by the background light and the dark current noise, respectively. Here $\eta_Q$ represents the quantum efficiency of the PD, $n_E$ is the elimination factor of the high-pass filter the receiver, B is the overall electronic bandwidth provided by the prototype and was obtained in Eq. (2), $P_{BG}$ is the received background power and $I_{dc}$ is the dark current of PD hardware. q=1.602×10$^{-10}$ C. is the elementary charge, h=6.626×10$^{-34}$ is the Plank's constant, and f represents the frequency of the light source. y(k) is the count of photo-electrons generated from the received data-carrying signal and is also a Poisson variable with an average in proportion to the PD output in the $k^{th}$ interval. By considering the effects of the L detected symbols prior to detection of the $k^{th}$ symbol on increasing the resulting average number of photo-electrons on the $k^{th}$ interval, y(k)'s expected value will be:

$$m_y(k) = \frac{\tilde{R}\tilde{h}}{q} \sum_{m=k-L}^{k} b_m \int_{(k-m)T_b}^{(k-m+1)T_b} \Gamma(t)dt \quad (11)$$

where $\tilde{R}$ is the responsivity of the cubical PD at the corresponding wavelength of the incident light ($\lambda$=445 nm, Blue color), and $\tilde{h}$ is a positive multiplicative fading coefficient (to characterize turbulence effects). Further, $\Gamma(t)$=h(t)*P(t) where h(t) is the impulse response of the vibrant VLC channel (which was empirically estimated in FIG. 8) and L is the channel memory, which increases with the vibration intensity, data rate, transmitter beam divergence angle, receiver FOV and distance. Eqs. (10) and (11) imply that r(k) is a Poisson variable with an average m(k) defined by:

$$m(k) = \tilde{m}(k)\tilde{h} + (n_b+n_d)T_b \quad (12)$$

where $\tilde{m}(k)$ is defined according to:

$$\tilde{m}(k) = \frac{\tilde{R}}{q} \sum_{m=k-L}^{k} b_m \int_{kT_b}^{(k+1)T_b} \Gamma(t-mT_b)dt \quad (13)$$

To achieve an optical decision metric for VLD receiver, the joint probability distribution function of the r(0), r(1), . . . r(N-1) is obtained as:

$$M_{MSD}(\underline{b}) = \frac{1}{2^L} \times \quad (14)$$

$$\prod_{i=0}^{N-1} \sum_{b_{i-1},\ldots,b_{i-L}} \left[ \int_0^\infty Poiss(r(i)|b_i, (b_{i-1}, \ldots, b_{i-L}), \tilde{h}_i) f(\tilde{h}_i) d\tilde{h}_i \right],$$

where N is the desired window length and $\tilde{h}_i$ is a random variable with Erlang distribution:

$$f(\tilde{h}_i; \lambda_F, \theta_F) = \frac{\lambda_F^{\theta_F}}{(\theta_F-1)!} \tilde{h}_i^{\theta_F-1} e^{-\lambda_F \tilde{h}_i}, \tilde{h}_i \geq 0 \quad (15)$$

In Eq. (15), $\lambda_F \in \mathbb{R}$ and $\theta_F \in \mathbb{Z}$ are selected so that the Erlang function conforms to the normalized Log-normal function with a variance of $\sigma_{\tilde{h}_i}^2$ and mean value 1 which is the typical case in VLC indoor links. By substituting Eq. (15) in Eq. (14), the optimum decision metric can be obtained as:

$$M_{MSD}(\underline{b}) = \frac{1}{2^L} \times \frac{((n_b + n_d)T_b)^{r(i)}}{r(i)!} \times \qquad (16)$$

$$\frac{\lambda_F^{\theta_F} e^{-(n_b+n_d)T_b}}{(\theta_F - 1)!} \times \prod_{i=0}^{N-1} \sum_{b_{i-1},\ldots,b_{i-L}} \frac{e^{\mu v} g_{\theta_F - 1}(r(i); \mu(i), v(i))}{v(i)(\mu(i)v(i))^{r(i)}}$$

where $$g_\theta(a; b, c) = c^{a+1} \int_0^\infty x^\theta (x+b)^a e^{-3(x+b)} dx, \; v(i) = \tilde{m}(i) + \lambda_F \text{ and}$$

$$\mu(i) = \frac{(n_b + n_d)T_b}{\tilde{m}(i)}.$$

Since only me last term in Eq. (16) includes the detected bits $b_i$s, the receiver needs to consider only that term for optimal decision on what bits were transmitted. Thus, the optimal receiver must select a bit vector for the $2^N$ possible bit vectors $\underline{b}=[b_0, b_1, \ldots b_{N-1}]$. It will do so by solving the following maximization problem:

$$\underline{\tilde{b}}_{N\times 1} = \underset{\underline{b}}{\operatorname{argmax}} \prod_{i=0}^{N-1} \sum_{b_{i-1},\ldots,b_{i-L}} \frac{e^{\mu(i)v(i)} g_{\theta_F - 1}(r(i); \mu(i), v(i))}{v(i)(\mu(i)v(i))^{r(i)}} \qquad (17)$$

where L represents the channel memory.

As VLC industry moves to data rates of 10 Mbps and beyond, ISI becomes a more significant problem compared to the lower data rates used previously. As it was concluded from the experimental results obtained from the prototype embodiments, ISI can result in complete eye closure at bit rates close to 20 Mbps in the presence of vibration. Moreover, the vibration in the receiver's structure causes the FOV of the system to vary with time, which itself causes time-varying ISI. Furthermore, factors such as temperature and bending also exacerbate this problem. The time-varying nature of ISI means that effective solutions need to constantly adapt to the changing channel characteristics. Previously, an approach using exhaustive search was considered. In this exemplary embodiment, a two-mode operational adaptive detector is designed and analyzed, namely, "Decision Feedback-Affine Projection Algorithm" (DF-APA) to tackle the ISI problem. This approach lends itself well to mixed-signal designs that can attain similar performance to the optimum MSD techniques. Moreover, the adaptive detector discussed in this embodiment offers a considerably lower computational complexity with a polynomial order.

Figure 9:
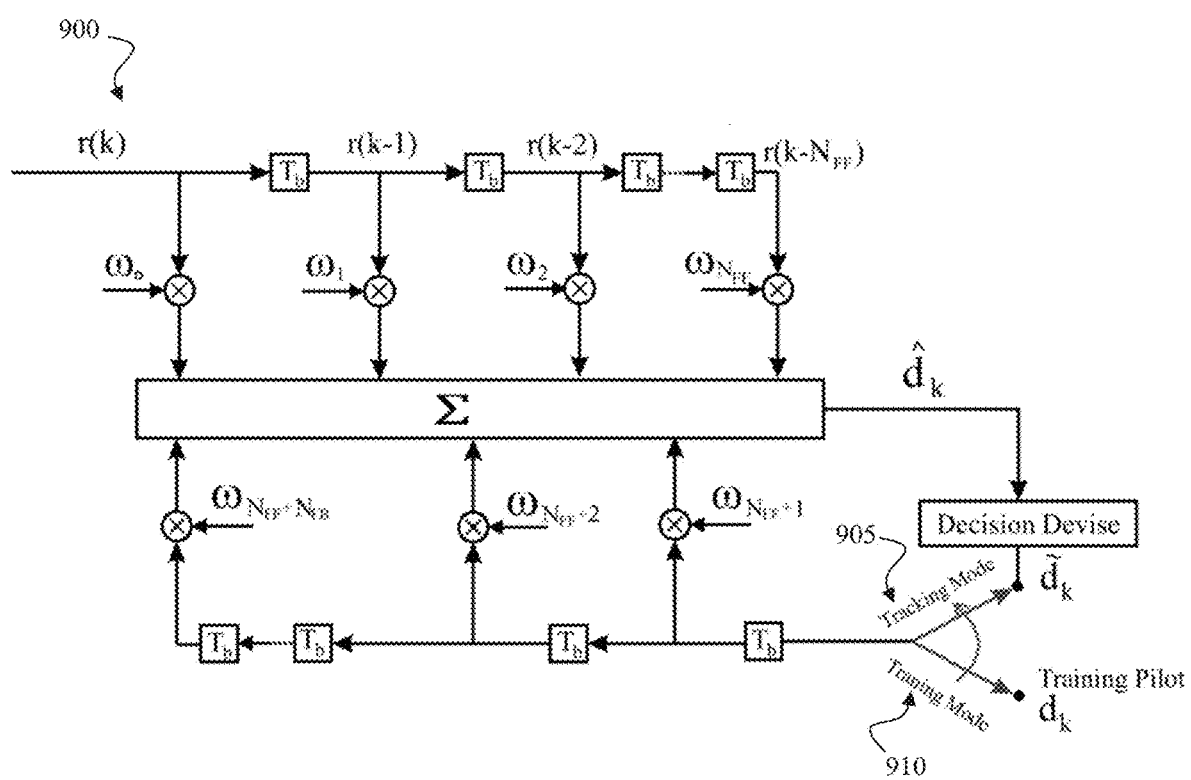
FIG. 9 is a schematic illustration of a decision feedback affine projection algorithm (DF-APA) detector, in accordance with an embodiment of the present invention.

The main idea behind decision feedback detectors is that when the data symbol is detected and decided, one can obtain and eliminate ISI on the future symbols prior to detection of the next symbols. This algorithm can be constructed as a feed forward (FF) filter and feedback (FB) filter in the optical receiver. ISI created by previously detected symbols on the current symbol can be adjusted using FB filter coefficients. Detector consists of $N_{FF}+1$ taps in its FF filter and $N_{FB}$ taps in its FB filter. As shown in FIG. 9, the adaptive system 900 works in two modes, i.e, training mode 905 and tracking mode 910, to detect the transmitted symbols. When in the training mode 905, the detector's output will be:

$$\hat{d}_k = \Sigma_{n=0}^{N_{FF}}[\omega_n r(k-n)] + \Sigma_{i=1}^{N_{FB}}[\omega_{N_{FF}+i} d_{k-1}] = \underline{\omega}^T(k) \underline{u}(k) \qquad (18)$$

where $\underline{u}(k) = [r(k) \ldots r(k-N_{FF}) d_{k-1} \ldots d_{k-F_{BB}}]^T$ is the input signal of the detector shown in FIG. 9, $\omega_{i=0, \ldots, N_{FF}+N_{FB}}$ are the gain coefficients (taps) used in the detector, $\underline{\omega}(k) = [\omega_0 \omega_1 \omega_2 \ldots \omega_{(N_{FF}+N_{FB})}]^T$ represents the impulse response of the overall discrete adaptive filter containing both FF and FB tap weight coefficients after being updated for k times and $d_i$ is the input training sequence. Based on the conventional protocol between the transmitter and receiver, the training sequence bits $d_i$ can be made available in the transmitter preamble packets, allowing the receiver to have full knowledge of these preamble bits and have full access to the training sequence. By obtaining the detector's output $\hat{d}_k$ in Eq. (18), the error signal $e_k$ is determined using $d_k - \hat{d}_k$ and $\tilde{d}_k - \hat{d}_k$ in the training and tracking modes, respectively. Here, $\tilde{d}_k$ can be computed as:

$$\tilde{d}_k = \begin{cases} 1 & \hat{d}_k \geq V_{Th} \\ 0 & \hat{d}_k \geq V_{Th} \end{cases} \qquad (19)$$

where $V_{Th}$ is the threshold voltage and is the average output voltage over multiple symbols. This method eliminates the need for channel state information in the receiver for generating the training sequence in tracking mode. The error signal is squared to obtain the mean square error at the instant of k, leading to:

$$J(k) = E\{|e_k|^2\} \qquad (20)$$

where J(k) is the cost function at the instant k.

Adaptive symbol detectors 900 require a special algorithm to update the detector coefficients and thus minimize the desired cost function. There exists a wide variety of adaptive algorithms updating filter coefficients. In one embodiment, an Affine Projection Algorithm (APA) was used to update the tap weight vector coefficients $\underline{\omega}(k)$ in Eq. (18). APA is a generalization of the well-known Normalized Least Mean Square (NLMS) adaptive filtering algorithm. Under this interpretation, each tap weight vector update of NLMS is viewed as a one-dimensional affine projection. In APA, the projections are made in multiple dimensions. As the projection dimension increases, so does the convergence speed of the tap weight vector, and unfortunately, the computational complexity of the algorithm. Here a two dimensional APA algorithm has been utilized which enables the minimization of the mean square error (MSE) between the output $\hat{d}_k$ and training sequence $d_k$, while converging to the optimum tap weight vector coefficients faster than the general NLMS algorithms.

Given the set of tap-input vectors $\underline{u}(k), \underline{u}(k-1), \ldots \underline{u}(k-(N_{FF}+N_{FB})+1$ and the set of desired output samples, $d_k, d_{k-1}, \ldots d_{k-(N_{FF}+N_{FB})+1}$, the tap-weight vector $\underline{\omega}(k+1)$ will be updated so as to minimize the squared Euclidean norm of the difference $\underline{\omega}(k+1) - \underline{\omega}(k)$ subject to $\underline{\omega}^T(n+1)\underline{u}(n-1) = d_{n-1}$ for $i = 0, 1, \ldots M-1$ as a set of constraints. Here, M is the number of applied constraints (i.e., dimensions). By increasing M, the convergence speed increases. However, this increase is limited by a threshold, after which its effect is negligible and further increment of M adds to the computational complexity. Note that NLMS algorithm is a special case of APA for M=1. In the DF-APA design of the present invention, both in training 905 and tracking modes 910, M=2 is set to increase the convergence speed compared to the common NLMS algorithm while maintaining the computational complexity at a moderate level. To update the tap weight vector in DF-APA, the following recursive optimization problem is formulated:

$$\min \|\underline{\omega}(n+1) - \underline{\omega}(n)\|^2 \quad (21)$$
$$\text{s.t.} \begin{cases} \underline{\omega}^T(n+1)\underline{u}(n) = d_n \\ \underline{\omega}^T(n+1)\underline{u}(n-1) = d_{n-1} \end{cases}$$

This optimization problem can best be solved using Lagrange multipliers, for which a recursive solution can be written as:

$$\underline{\omega}(n+1) = [I - \mu A^T(n)[A(n)A^T(n)]^{-1}A(n)]$$
$$\underline{\omega}(n) + \mu A^T(n)[A(n)A^T(n)]^{-1}\underline{d}(n) \quad (22)$$

where $\mu$ is the step size for controlling the algorithm's overall stability and convergence speed, $A^T(n) = [\underline{u}(n), \underline{u}(n-1), \ldots, \underline{u}(n-M+1)]$ and $\underline{d}^T(n) = [d_n, d_{n-1}, \ldots, d_{n-M}]$ and M=2. The computational cost of solving Eq. (22) is $O(M(N_{FF}+N_{FB}))$ per sample (iteration).

In comparing the prototype's performance with the optimal MSD and adaptive symbol detection (DF-APA) techniques, the prototype uses Symbol-by-Symbol Detection (SBSD) while MSD and DF-APA perform additional computation to improve the BER of the VLC link. This comparative evaluation will reveal the benefit of computation in tackling the performance degradation of the receiver's vibration in the VLC link. At a high level, Table III details the memory and computation complexities of the three symbol detection techniques.

TABLE III

COMPLEXITY OF SYMBOL DETECTION.

| Algorithm | DF-APA | MSD | SBSD |
|---|---|---|---|
| Memory | $O(N_{FF} + N_{FB})$ | $O(N)$ | $O(1)$ |
| Computation | $O(M(N_{FF} + N_{FB}))$ | $O(2^N)$ | $O(1)$ |

SBSD is the baseline approach in the exemplary prototype which makes detection for every symbol without spending any additional memory or computation. On the other end of the design spectrum, MSD finds the optimum detection for every N bits with an exponential time and linear memory complexity. The adaptive filtering technique DF-APA, which is a commonly used machine learning method for digital signal processing, finds a middle-ground by attaining linear time and memory complexity with some degradation of BER. In the evaluation, the goal is to quantify this degradation too. By using the empirical channel impulse response of the prototype VLC link, SBSD, MSD and DF-APA are simulated. Table IV summarizes key system parameters in the simulation, including the transmitter and receiver specifications.

TABLE IV

SYSTEM PARAMETERS USED IN SIMULATIONS.

| Coefficient | Value |
|---|---|
| Responsivity at $\lambda$ = 455 nm, $\mathcal{R}$ (FIG. 3) | 0.13 |
| $\{G_{TIA}, G_{HPF}, G_{WBA}\}$ (FIG. 4) | $\{25, 2.57, 4001\}$ |
| Quantum efficiency, $\eta_Q$ | 0.7 |
| HPF elimination factor, $\eta_E$ | $10^{-6}$ |
| Electronic bandwidth, B (Eq. (2)) | 20.16 MHz |
| Optical blue filter bandwidth (Full Width Half Max), $\Delta\lambda$ (FIG. 5(b)) | 40 ± 8 nm |
| Optical filter transmissivity at $\lambda$ = 445 nm, $T_F$ (FIG. 5(b)) | 0.76 |
| Dark current, $I_{dc}$ at $V_B$ = 18 V | 80 μA |
| Transmission bit rate, $R_b$ | 20 Mbps |
| Center-to-center LoS distance between transmitter and receiver | 7.1 m |
| Channel memory, L | 7 |
| $\{\lambda_F, \theta_F\}$ [54] | $\{6.472, 6\}$ |

Figure 10A:
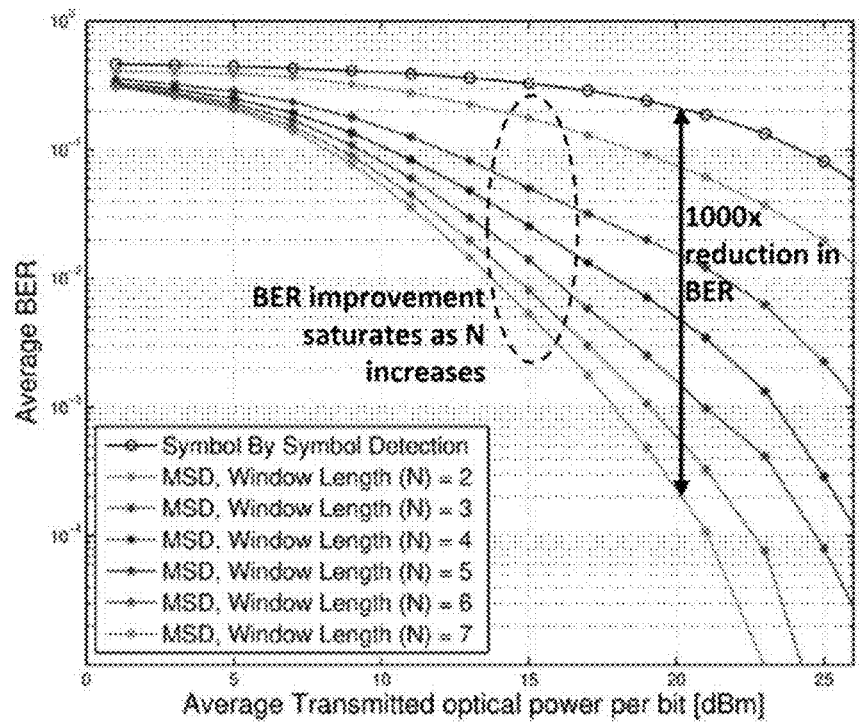
FIG. 10(a) is a graphical illustration of the BER of the optimal MSD receiver at varying window lengths for a 20 Mbps vibrant VLC link at 7.1 m distance, in accordance with an embodiment of the present invention.
Figure 10B:
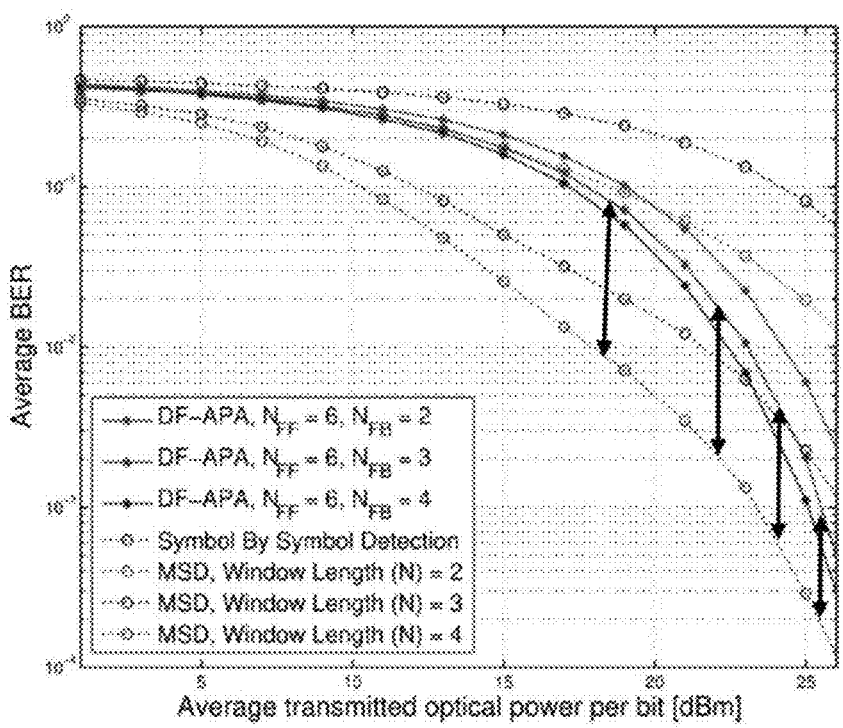
FIG. 10(b) is a graphical illustration of the BER comparison between suboptimal DF-APA and optimal MSD receiver at varying window lengths for a 20 Mbps vibrant VLC link at 7.1 m distance, in accordance with an embodiment of the present invention.
Figure 10C:
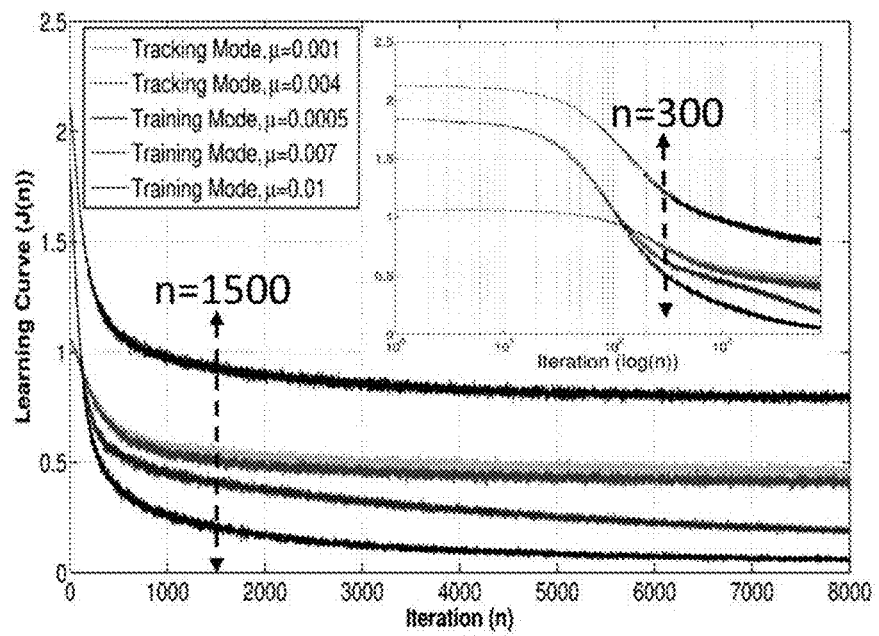
FIG. 10(c) is a graphical illustration of the learning curves of the DF-APA in training and tracking modes for a 20 Mbps vibrant VLC link at 7.1 m distance, in accordance with an embodiment of the present invention.

By employing the MSD optimal detector in the receiver, the effect of increasing the window length N on improving the performance of the vibrating receiver at a bit rate of 20 Mbps is investigated. Since the highest detrimental ISI effects occur at this bit rate, this particular bit rate is chosen for evaluation. Moreover, the main interest is in the performance of the MSD optimal detector in improving the detection efficiency under the worst conditions which in the current case happens at 20 Mbps over 7.1 m distance. As shown in FIG. 10(*a*), increasing the window length in the MSD detector from N=2 to N=7 significantly decreases the average BER. Further increases in the window length (N≥8) have no notable effect on the performance and merely increases the computational complexity and the required buffer for storage of received signal symbols while delaying the decisions on the most probable transmitted N-bit.

To understand if adaptive symbol detection will suffice, the performance of the DF-APA suboptimal detector and the optimal detector MSD in minimizing the detrimental ISI effects caused by the vibrations as well as in increasing the average BER at a bitrate of 20 Mbps are compared, as shown in FIG. 10(*b*). Moreover, the effect of the number of tap weights employed in the FF and FB filters in DF-APA (FIG. 10(*b*)) on improving the system performance is studied. A step size $\mu$=0.0005 was used to plot the BER diagrams associated with the DF-APA detector. As shown in FIG. 10(*b*), DF-APA is able to achieve a performance close to that of the MSD optimal detector with a window length N=4 by employing 6 tap weights in the FF filter ($N_{FF}$=6) and 3 tap weights in the FB filter ($N_{FB}$=3) at a much lower computational complexity. However, this performance improvement by DF-APA requires accessing at least 1,000-bit training sequence (for a step size $\mu$=0.0005) in the receiver.

An appropriate step size is critical for DF-APA detector in order to attain a good convergence speed and stability. FIG. 10(*c*) illustrates the relationship between the Mean Squared Error (MSE) by DF-APA and training sequence ($d_k$ in training mode and 4 in tracking mode) length in both training and tracking modes, where the number of gain taps in the detector's FF and FB filters are 6 and 3, respectively. To depict the learning curve, the expression $J(n)=|d_k-\hat{d}_k|^2$ in the training mode and $J(n)=|\tilde{d}_k-\hat{d}_k|^2$ in the tracking mode are computed from the detector's output, and after 1,000 times of running, the mean value of the results are obtained. As seen, J(n) converges after about 1,500 iterations of updating the filter coefficients $\underline{\omega}(n)$. Looking at various step sizes, the higher the step size (red and purple curves), the faster DF-APA finds the best coefficient configuration for symbol detection. However, higher step sizes may cause the filter going into potentially unstable operation. FIG. 10(*c*) shows that for step sizes µ≤0.01 the DF-APA filter is stable. In particular, after about 300 iterations, all step sizes in both modes result in sufficient improvement in the learning curve and converge.

A key insight from the results is that DF-APA attains very fast learning of the VLC channel in about 1,500 iterations. This translates to roughly $N_{FF}+F_{FB} \times 1,500$ arithmetic operations for a converged training. In a typical CPU with GHz clock frequencies, this could be done in the order of microseconds. Including the operating system delays, DF-APA can easily re-learn the tap weight coefficients in several milliseconds, thereby making it possible to handle mobility in the receiver. Assuming that the receiver moves due to human movements, for instance within an office, the changes in the VLC channel's response will easily be handled by the DF-APA approach, because its microsecond re-learning timescale will be significantly smaller than human movement timescale in 100 s of milliseconds.

Figures 11A, 11B, 11C:
FIG. 11(a) illustrates a prototype's reception quality (SBSD) for a real-time data transmission via the VLC link, in accordance with an embodiment of the present invention.
FIG. 11(b) illustrates reception for a suboptimal DF-APA detection ($N_{FF}$=6, $N_{FB}$=3) for a real-time data transmission via the VLC link, in accordance with an embodiment of the present invention.
FIG. 11(c) illustrates reception for an optimal MSD (N=5) for a real-time data transmission via the VLC link, in accordance with an embodiment of the present invention.

To evaluate real-time data transmission, a 512×512 black-white image was transmitted via the VLC system with a vibrant receiver. The distance was set to 7.1 m and the bit rate was 20 Mbps. FIG. 11(a), FIG. 11(b) and FIG. 11(c) show the received image quality in these experiments using the receivers SBSD, DF-APA, and MSD, respectively. In this embodiment, an MSD with a window length of N=4, and DF-APA method with buffers $N_{FF}$=6 and $N_{FB}$=3 were used. As shown, the quality of the received signal using the DF-APA detector is not significantly different compared to that of the MSD detector, but the computational complexity and the computing time requirement for the DF-APA detector are considerably lower.

In various embodiments of the present invention, the design of a VLC system with capability of data communication up to 20 Mbps over a 7.1 m distance is provided. Vibrant and non-vibrant indoor VLC links were considered. By deploying the prototype, the detrimental effects of intense vibrations in the receiver's structural body on the VLC channel impulse response and integrity of the received signal were experimentally studied. Furthermore, reducing the ISI and adapting to the time varying nature of the vibrant VLC link and increasing the receiver's performance, optimal MSD and sub-optimal adaptive DF-APA detectors were exploited. Remarkable performance improvement was achieved by deploying the optimal MSD detectors within the vibrant VLC links but with exponential time requirements, and comparable improvements were obtained by the sub-optimal DF-APA algorithm in polynomial time.

The present invention provides for the possibility of attaining VLC receivers with large reception areas which may be designed conformal to receiver's surface. Future work could explore the benefit of using more computation and learning to improve the performance of mobile VLC receivers. Using single photon avalanche photodiodes (SPAD) instead of avalanche photodiodes (APD) may prove to attain higher communication ranges at indoor environments with low-level light intensity.

The present invention may be embodied on various computing platforms that perform actions responsive to software-based instructions. The following provides an antecedent basis for the information technology that may be utilized to enable the invention, and in particular to enable the optimal and adaptive multi-symbol detection (MSD) algorithms to handle the time-varying nature of the vibrant VLD channel.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A visible light communication (VLC) receiver, the receiver comprising:
   a photodetector (PD) array comprising a plurality of photodetectors to generate data-carrying photo-current in response to receiving a visible light communication;
   a transimpedance amplifier coupled to the PD array, the transimpedance amplifier to convert the data-carrying photo-current from the PD array to data-carrying voltage signals;
   a high pass filter coupled to the transimpedance amplifier to filter the data-carrying voltage signals from the transimpedance amplifier to output filtered data-carrying voltage signals; and
   a wideband voltage amplifier coupled to the high pass filter, the wideband voltage amplifier comprising a non-inverting amplifier coupled to the high pass filter and a pulse amplifier coupled to an output of the non-inverting amplifier to amplify the filtered data-carrying voltage signals to output amplified filtered data-carrying voltage signals.

2. The receiver of claim 1, further comprising a voltage detector coupled to the wideband voltage amplifier, the voltage detector to convert the amplified filtered data-carrying voltage signals to a transistor-transistor logic (TTL)-compliant bitstream.

3. The receiver of claim 2, wherein the voltage detector is a symbol-by-symbol detector (SBSD).

4. The receiver of claim 2, wherein the voltage detector is a multiple-symbol detector (MSD).

5. The receiver of claim 2, wherein the voltage detector is a decision feedback affine projection detector (DF-APA).

6. The receiver of claim 1, wherein the PD array is reverse biased using the transimpedance amplifier.

7. The receiver of claim 1, wherein the plurality of photodetectors of the PD array are conformal to the surface of a device.

8. The receiver of claim 1, wherein the plurality of photodetectors of the PD array are arranged to form a cube to provide a 360° field of view (FOV) and omni-directional signal reception.

9. The receiver of claim 1, wherein the plurality of photodetectors of the PD array are arranged to form a two-dimensional substantially flat surface.

10. The receiver of claim 1, wherein each of the plurality of photodetectors of the PD array has an active area of about 1 cm$^2$ and a rise time of about 18 ns.

11. A visible light communication (VLC) receiver, the receiver comprising:
    a photodetector (PD) array comprising a plurality of photodetectors to generate data-carrying photo-current in response to receiving a visible light communication;
    a transimpedance amplifier coupled to the PD array, the transimpedance amplifier to convert the data-carrying photo-current from the PD array to data-carrying voltage signals;
    a high pass filter coupled to the transimpedance amplifier to filter the data-carrying voltage signals from the transimpedance amplifier to output filtered data-carrying voltage signals;
    a wideband voltage amplifier coupled to the high pass filter, the wideband voltage amplifier to amplify the filtered data-carrying voltage signals to output amplified filtered data-carrying voltage signals; and
    a decision feedback affine projection detector (DF-APA) coupled to the wideband voltage amplifier, the decision feedback affine projection detector (DF-APA) to convert the amplified filtered data-carrying voltage signals to a transistor-transistor logic (TTL)-compliant bitstream.

12. A method for visible light communication (VLC) reception, the method comprising:
    receiving a visible light communication at a photodetector (PD) array, the PD array comprising a plurality of photodetectors;
    generating, at the PD array, data-carrying photo-current in response to receiving the visible light communication;
    converting the data-carrying photo-current from the PD array to data-carrying voltage signals at a transimpedance amplifier coupled to the PD array;
    filtering the data-carrying voltage signals from the transimpedance amplifier to output filtered data-carrying voltage signals at a high pass filter coupled to the transimpedance amplifier to filter; and
    amplifying the filtered data-carrying voltage signals to output amplified filtered data-carrying voltage signals at a wideband voltage amplifier coupled to the high pass filter wherein the wideband voltage amplifier comprises a non-inverting amplifier coupled to the high pass filter and a pulse amplifier coupled to an output of the non-inverting amplifier.

13. The method of claim 12, further comprising, converting the amplified filtered data-carrying voltage signals to a transistor-transistor logic (TTL)-compliant bitstream at a voltage detector coupled to the wideband voltage amplifier.

14. The method of claim 13, wherein the voltage detector is selected from a symbol-by-symbol detector (SBSD), a multiple-symbol detector (MSD) and a decision feedback affine projection detector (DF-APA).

15. The method of claim 12, further comprising reverse biasing the PD array is using the transimpedance amplifier.

16. The method of claim 12, wherein the plurality of photodetectors of the PD array are conformal to the surface of a device.

17. The method of claim 12, wherein the plurality of photodetectors of the PD array are arranged to form a cube to provide a 360° field of view (FOV) and omni-directional signal reception.

18. The method of claim 12, wherein the plurality of photodetectors of the PD array are arranged to form a two-dimensional substantially flat surface.

* * * * *